US008959443B2

(12) United States Patent
Law

(10) Patent No.: US 8,959,443 B2
(45) Date of Patent: *Feb. 17, 2015

(54) METHOD AND SYSTEM FOR PRESENTING A VISUAL REPRESENTATION OF THE PORTION OF THE SETS OF DATA THAT A QUERY IS EXPECTED TO RETURN

(75) Inventor: Margaret T. Law, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,830

(22) Filed: Mar. 29, 2012

(65) Prior Publication Data
US 2012/0188252 A1 Jul. 26, 2012

Related U.S. Application Data

(63) Continuation of application No. 11/701,316, filed on Jan. 31, 2007, now Pat. No. 8,171,418.

(51) Int. Cl.
*G06F 3/048* (2013.01)
*G06F 17/30* (2006.01)
(52) U.S. Cl.
CPC .... *G06F 17/30389* (2013.01); *G06F 17/30554* (2013.01)
USPC ............................ 715/764; 715/762; 715/730

(58) Field of Classification Search
USPC .......................................... 715/762, 764, 730
See application file for complete search history.

(56) References Cited

U.S. PATENT DOCUMENTS

| 2002/0052933 | A1* | 5/2002 | Leonhard et al. | 709/219 |
| 2004/0210936 | A1* | 10/2004 | Rao et al. | 725/87 |
| 2005/0108055 | A1* | 5/2005 | Ott et al. | 705/2 |
| 2006/0026033 | A1* | 2/2006 | Brydon et al. | 705/1 |

* cited by examiner

*Primary Examiner* — Omar Abdul-Ali
*Assistant Examiner* — Sherrod Keaton
(74) *Attorney, Agent, or Firm* — Haynes Beffel & Wolfeld LLP; Ernest J. Beffel, Jr.

(57) ABSTRACT

In an embodiment, a user is provided with a data representation covered by a relationship. For example, the data representation may include a collection of data objects representations. In an embodiment, the data object representations are arranged in a manner so as to indicate rows or records of different data objects that are associated with one another. In an embodiment, portions of the data objects in the collection are indicated as representing the data that is covered by the relationship. In an embodiment, a report representation that is expected to be generated by the report type defined by the user defined relationship is also provided. In an embodiment, a correspondence in indicated between elements of the report representation (e.g., columns in a thumbnail sketch of a report) and the data object representations (e.g., ovals in a Venn diagram).

16 Claims, 18 Drawing Sheets

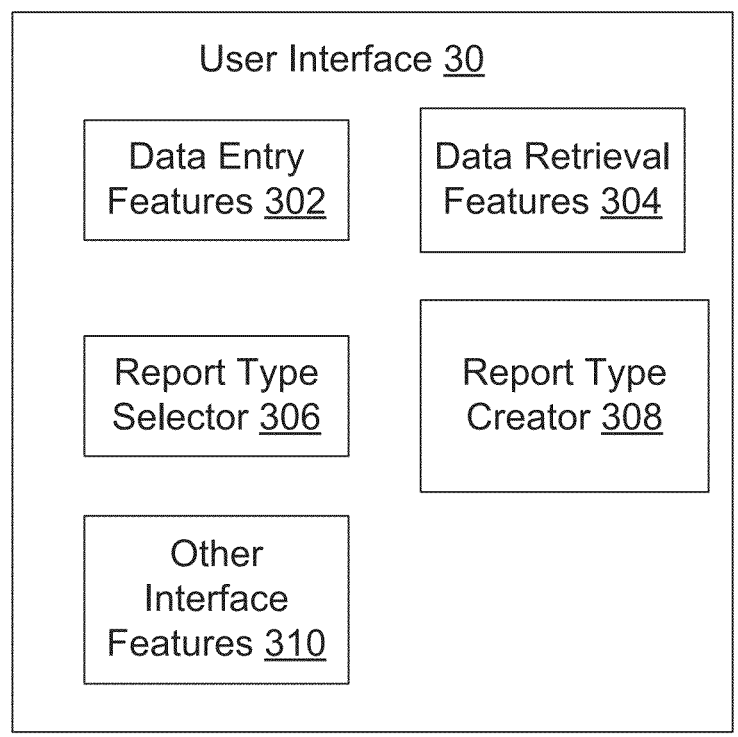
FIG. 3A1

312

Select the data type

313  Select the type of data you wish to report on.

Accounts & Contacts

| Accounts |
| Accounts and Test |
| Contacts & Accounts |
| Contacts & Accounts and Test |
| Accounts with Partners |
| Accounts with Partners and Test |
| Account with Account Teams |
| Account with Account Teams and Test |
| Accounts with Contact Roles |
| Accounts with Contact Roles and Test |

Account Partner Report

| Account Name | Partner Name | City | State |
|---|---|---|---|
| Acme, Inc | Global Consulting Services | San Jose | CA |
| Gene Point | Technology Partners Corp. | New York | NY |
| Genwatt, Inc | Power Incorporated | Austin | TX |

Cancel  Next

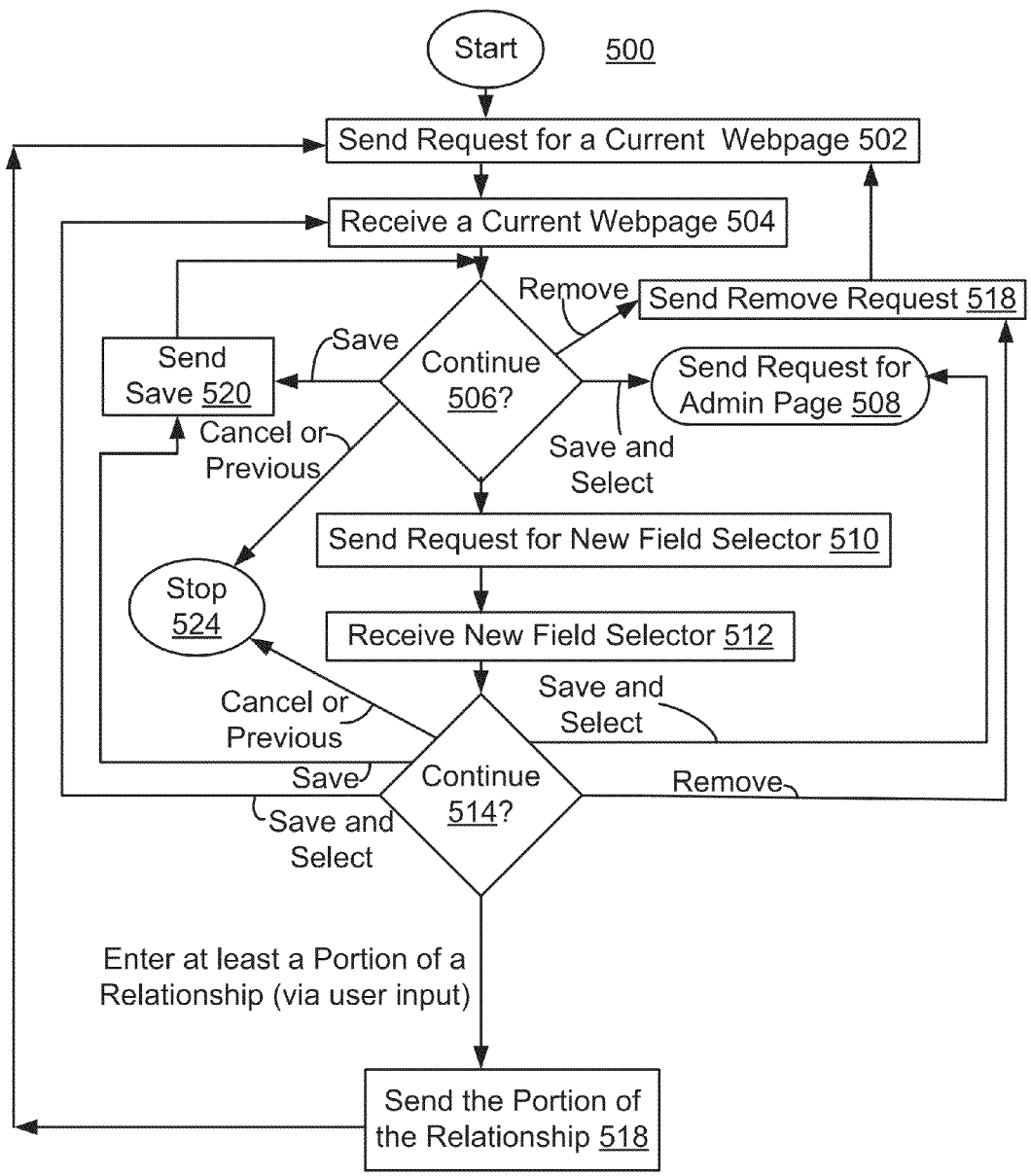
FIG. 5A1

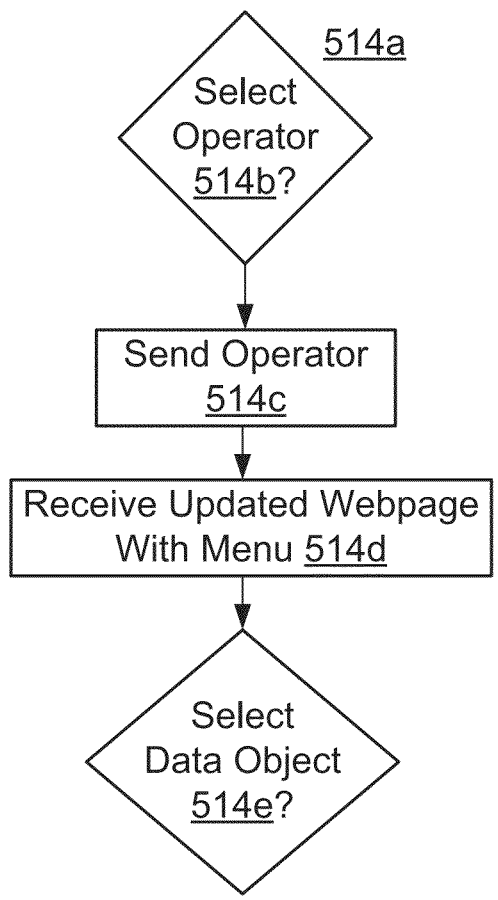
FIG. 5A2

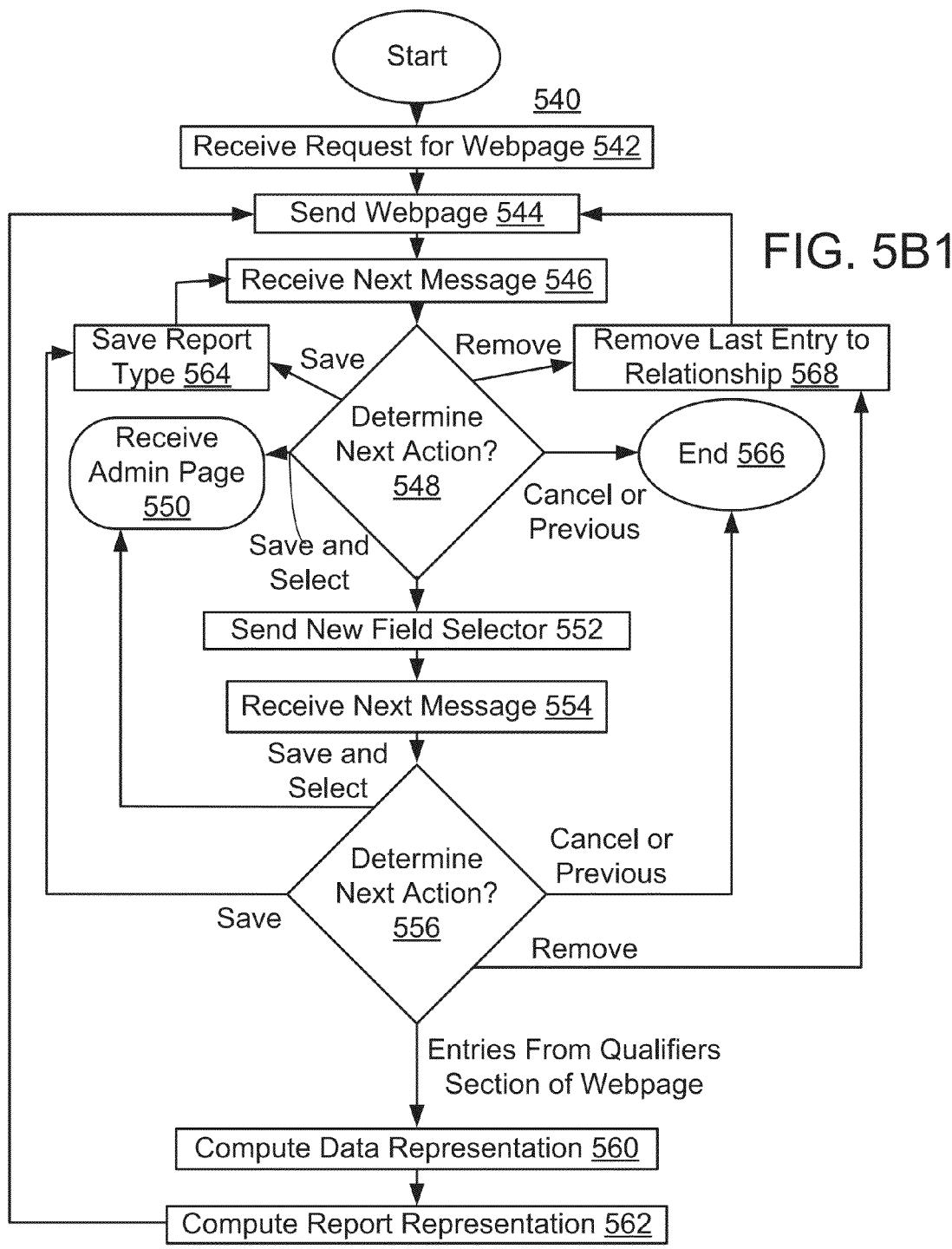
FIG. 5B1

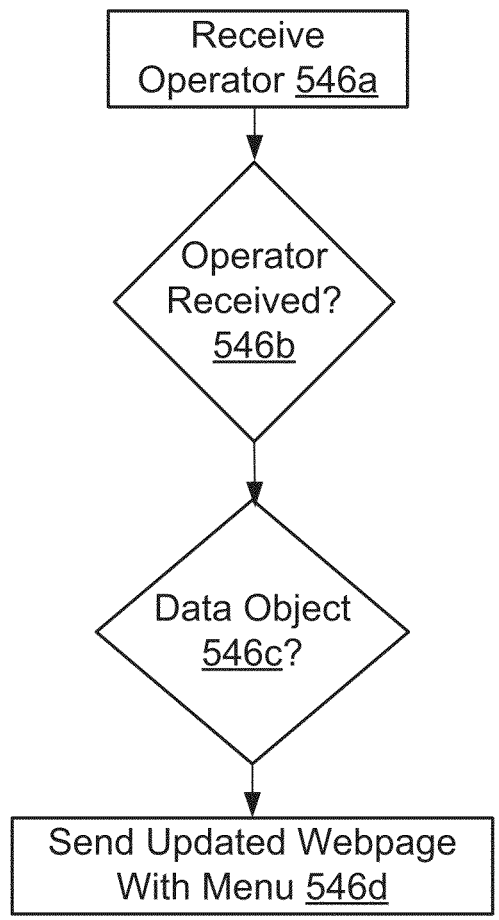
FIG. 5B2

US 8,959,443 B2

METHOD AND SYSTEM FOR PRESENTING A VISUAL REPRESENTATION OF THE PORTION OF THE SETS OF DATA THAT A QUERY IS EXPECTED TO RETURN

CLAIM OF PRIORITY

This application is a continuation of U.S. patent application Ser. No. 11/701,316, entitled "METHOD AND SYSTEM FOR PRESENTING A VISUAL REPRESENTATION OF THE PORTION OF THE SETS OF DATA THAT A QUERY IS EXPECTED TO RETURN," by Margaret T. Law, filed Jan. 31, 2007, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to presenting relationships in user interfaces for databases.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The ease of use and efficient retrieval of accurate information and subsequent delivery of this information to the user in a manner that is easy to understand is desirable.

Unfortunately, conventional database approaches to entering a relationship confuse the user. For example, when presented with the ability to select and relate data objects for the purpose of building reports, it can be difficult to understand the resulting data set and how it might be represented in a report. As an illustration, consider the relationships that characterize "Accounts with Contacts with and without Opportunities without Products." The cognitive load required to understand this data set challenges more than a few database software users. As a result, the process of constructing these relationships can be bewildering or error-prone. Erroneous relationships may or may not become obvious upon reviewing report data. Even when the error is obvious from looking at the report, it may take several tries before the relationship is debugged and corrected.

Accordingly, it is desirable to provide techniques enabling the user of the database system, and/or components of the database system to improve the ease of use of the database system.

BRIEF SUMMARY

In accordance with embodiments, there are provided mechanisms and methods for a visual representation of the portion of the sets of data that a relationship is expected to return. In an embodiment, a user is provided with a representation of the data (which may be referred to as a data representation) covered by a relationship. For example, the data representation may include a collection of representations of data objects (which may be referred to as data object representations and which—for example—may be ovals or other geometric shapes). In an embodiment, the data object representations are arranged in a manner so as to indicate rows that will appear in a report that will have data contributions from multiple data objects. The rows of the report that have contributions from multiple data objects may be referred to as rows that are common to each data object (because each data object has a portion of the final row). In one example, the arrangement of the data object representations may be a Venn diagram in which common rows (i.e., records) are indicated by the overlapping portions of the ovals or other geometric objects.

In an embodiment, portions of the representations of the data objects in the collection are indicated as being representative of the data that is covered by the relationship. For example, one or more portions of the one or more of data object representations are highlighted (e.g., by shading or coloring those portions), thereby indicating that the data corresponding to the shaded portions is included within the relationship.

In an embodiment, a representation of a report (which may be referred to as a report representation) that is expected to be generated by the report type that is being defined by the user is also provided. For example, a thumbnail sketch of what the report (that results from the report type) is expected to look like is shown in conjunction with the data representation. The term report type may refer to an engine that determines what end-users will see in a report generation wizard under a Reports tab. In an embodiment, the report representation may include representations of columns or blocks of data. In an embodiment, a correspondence is indicated between elements of the report representation (e.g., columns in the thumbnail sketch) and the data representations (that represent data objects). For example, a given column of a report representation may have the same coloring and/or shading as the corresponding data representation (e.g., the corresponding ovals). These mechanisms and methods for providing an interface for object relationships can enable embodiments to provide an interface that is easier to use and/or understand. The ability of embodiments to provide a data representation and/or a report representation can enable the user to better understand the relationship that the user defined.

While the present invention is described with reference to an embodiment in which techniques for a method and system for providing an interface for object relationships are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3A1 shows an embodiment of the user interface of FIG. 2;

FIG. 3A2 shows an embodiment of a page of the report type selector of FIG. 3A1;

FIG. 5A1 shows a flowchart of an example of a method for interacting with an interface, such as that of using FIGS. 3A1-4F, using a user system for producing a report type;

FIG. 5A2 shows a flowchart of an example of a method for implementing one of the steps of FIG. 5A1;

FIG. 5B1 shows a flowchart of an example of a method for creating a report type that is performed at the on-demand database FIG. 1;

FIG. 5B2 shows a flowchart of an example of a method for implementing one of the steps of FIG. 5B1;

DETAILED DESCRIPTION

General Overview

Systems and methods are provided for providing an interface for object relationships.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing one or more methods and systems for providing an interface for object relationships will be described with reference to example embodiments.

System Overview

Figure 1:
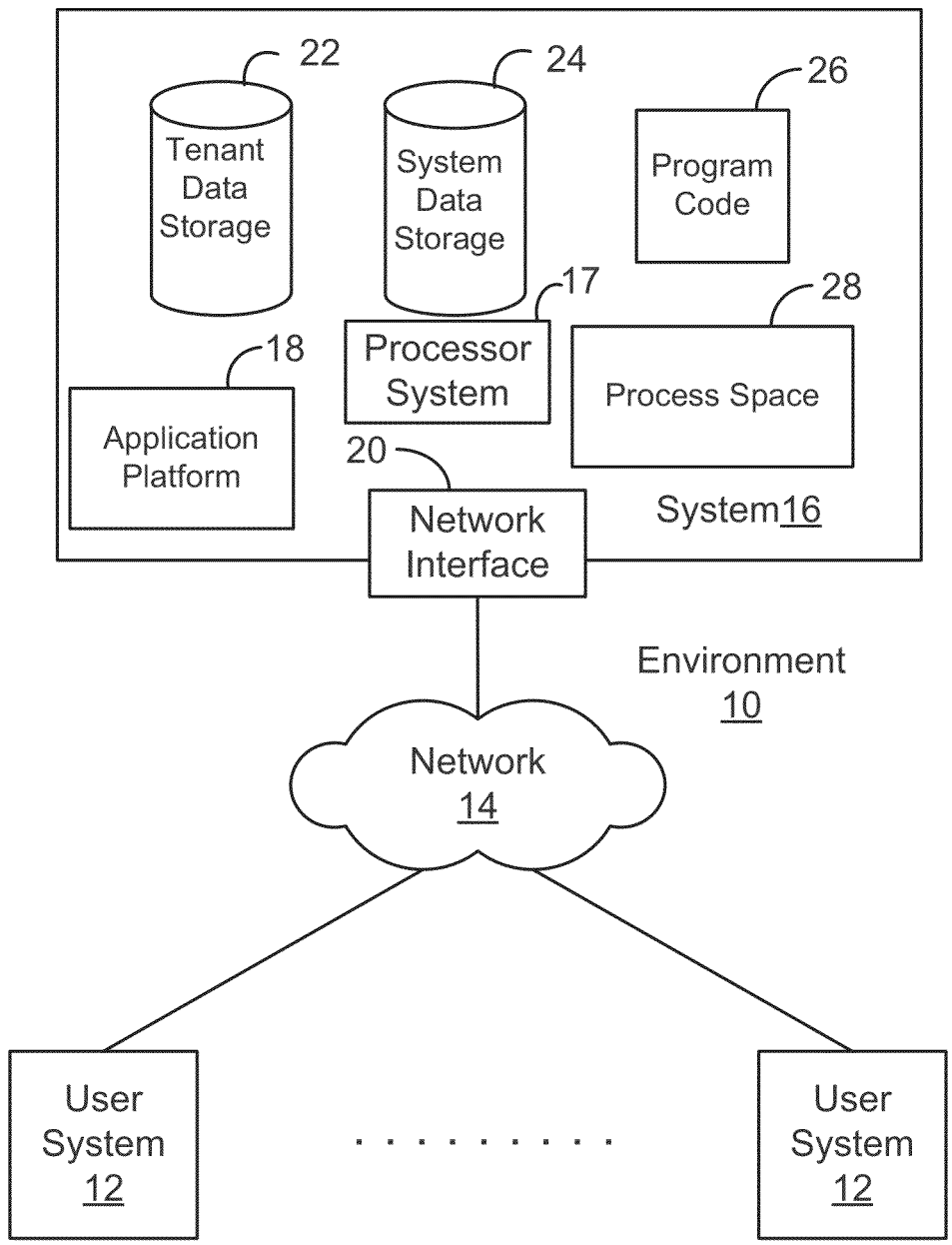
FIG. 1 illustrates an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. In the example of FIG. 1, environment 10 includes user system 12, network 14, and system 16. User system 12 may be any machine or system that is used by a user to access a database user system. For example, any of the user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

On-demand database service 16 is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s).

Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations are may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages, and other information to and from user systems 12 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages the creation and storage of the applications into one or more database objects and manages executing of the applications in a virtual machine in the process space of the system 16.

One arrangement for elements of system 16 is shown in FIG. 1, including a network interface 20, application platform 18, tenant data storage 22, and system data storage 24, which are accessible to system 16 and possibly accessible to multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit, such as such as processor system 17, which may be an Intel Pentium® processor or the like. Similarly, system 16 (and additional instances of an MTS, where more than one is present) and all of their components might be operator configurable using application(s) including computer code to run using a central processing unit which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications, and other data and media content as described herein are downloaded and stored on a hard disk. Alternatively, the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disks (DVDs), compact disks (CDs), microdrives, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database described herein can be implemented as single databases, a distributed database, a collection of distributed databases, a database with redundant online or offline backups or other redundancies, etc., and might include a distributed database or storage network and associated processing intelligence.

Figure 2:
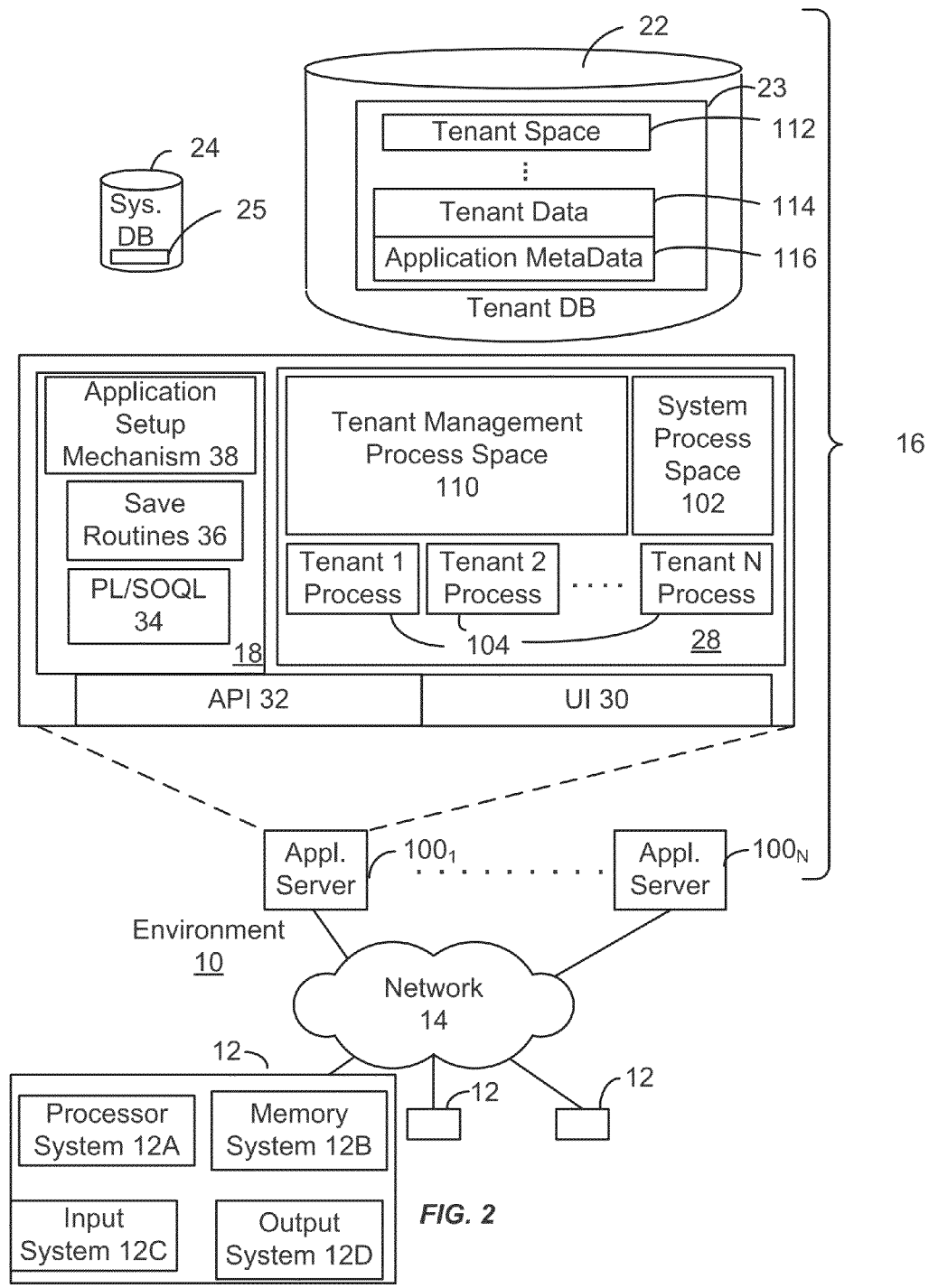
FIG. 2 illustrates the environment of FIG. 1 further including various possible interconnections between these elements in an embodiment.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant storage 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant data 112, tenant data 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 includes a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and tenant storage 23 therein, and access storage 24 and the system data 25 therein to serve requests of user systems 12. The tenant storage 23 might be divided into individual tenant space 112, which can be either a physical arrangement and/or a logical arrangement of data. Within each tenant space 112, tenant data 114 and application metadata 116 might be similarly allocated for each user. For example, a copy of a user's most recently used (MRU) items might be stored to tenant data 114. Similarly, a copy of MRU items for an entire organization that is a tenant might be stored to tenant space 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process space 104 managed by tenant management process 110, for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to tenant storage 23 and system data 25, via a different network connection. For example, one server $100_1$ might be coupled via the Internet, another server $100_{N-1}$ might be coupled via a direct network link, and another server $100_N$ might be coupled by yet a different network connection. Transfer Control Protocol and Internet Protocol (TCP/IP) are typical protocols for communicating between servers 100 and the database system. However, it will be apparent to one skilled in the art that other transport protocols may be used to optimize the system depending on the network interconnections used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the servers 100 and the user systems 12 to distribute requests to the servers 100. In one embodiment, the load balancer uses a least connections algorithm to route user requests to the servers 100. Other examples of load balancing algorithms, such as round robin and observed response time, also can be used. For example, in certain embodiments, three consecutive requests from the same user could hit three different servers 100, and three requests from different users could hit the same server 100. In this manner, system 16 is multi-tenant, wherein system 16 handles storage of, and access to, different objects, data, and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, client systems 12 communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It may be transparent to customers that their multiple "tables" are in fact stored in one large table or that their data may be stored in the same table as the data of other customers.

User Interface

FIG. 3A1 shows an example of UI 30 (FIG. 2), which may include data entry features 302, data retrieval feature 304, report type selector 306, report type creator 308, and other interface features 310. In other embodiments, UI 30 may not have all of the parts listed and/or may have other parts instead of, or in addition to, those listed above.

Data entry features 302 may include one or more features of UI 30 (FIG. 2) that are for entering data into system 16 (FIGS. 1 and 2). For example, data entry features 302 may include one or more fields for entering data and/or one or more buttons for uploading data from a file.

Data retrieval features 304 may include one or more features of UI 30 (FIG. 2) that are for retrieving data from system 16 (FIGS. 1 and 2). For example, data retrieval features 304 may include a window for viewing data and/or one or more links such as buttons and tabs for downloading data.

Report type selector 306 is one or more features of UI 30 (FIG. 2) that allows the user to select from one of several report types that already exist. For example, report type selector 306 may include a pull down menu of different types of report types that are available. Report type selector 306 may be part of the report generation wizard under the Reports tab.

Report type creator 308 allows the user to define a report type. In an alternate embodiment, report type creator 308 may also be part of the report generation wizard under the Reports tab. Report type creator 308 may provide the user with the ability to create and edit custom report types, which may mix and match data from a variety of data object representations based on the data model. Report type creator 308 may also provide administrators with the ability to manage the report types that can be created. Report type creator 308 may control which objects, operators (e.g., joins and/or filters) and fields are available to end users when creating new reports. In an embodiment, report type creator 308 may only be available to users (e.g., administrators) that have higher than a certain level of access. Report type creator 308 is discussed further in conjunction with FIGS. 3B and 4A-G.

Other features 310 may include other features associated with UI 30, such as one or more features that allow the user to select one or more filters to filter the data in a report. Other features 310 may include tools for formatting the report and choosing the order in which the columns appear in the report. Other features 310 may include one or more features related to security, such as the assigning and granting of different levels of the authorization to various users. Other features 310 may include one or more features granting access to different data and/or the authority to perform different types of operations based on the level of authorization previously assigned. Other features 310 may include features that relate to altering a user's personal setup, altering the setup of applications, altering the administrative setup, and/or altering subscriptions (e.g., adding ordering new services).

FIG. 3A2 shows an embodiment of report type selection page 312 of the report type selector 306 of FIG. 3A1. Report type selection page 312 may include pull down menu 313 and scrolling menu 314. Report type selection page 314 may be used for selecting a report type via pull down menu 313 and scrolling menu 314, which determines the data that will be placed in the resulting report. Pull down menu 313 is used for selecting categories (groupings) of report types. The selection chosen via pull down menu 313 determines the report types that appear and are available for selection via scrolling menu 314.

Interface for Report Type Creator

Figure 3B:
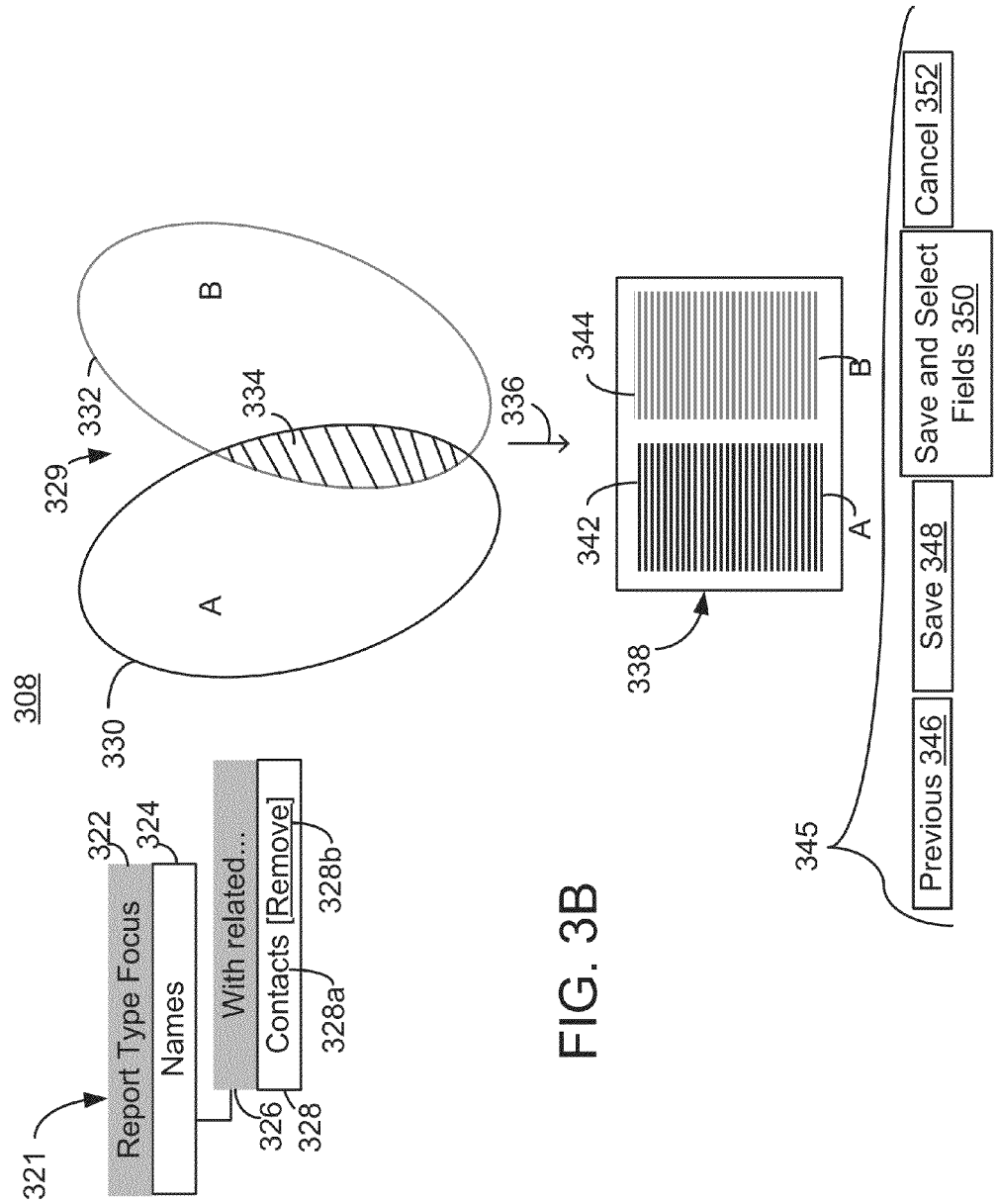
FIG. 3B shows an embodiment of the report type creator of FIG. 3A1.

FIG. 3B shows an example of a page of report type creator 308 (FIG. 3A1). Report type creator 308 page includes configurable relationship representation 321, which includes first label 322, first object name 324, operator name 326, and second object name 328 having name 328a and remove link 328b. Report type creator 308 page also includes data representation 329, which includes first object record set representation 330 (which for brevity will be referred to as first object representation 330), second object record set representation 332 (which for brevity will be referred to as second object representation 333), and result set representation 334 (which for brevity will be referred to as result representation 334). Report type creator 308 page also includes a pointer icon 336 (which for brevity will be referred to as icon 336), and report representation 338, which includes first column representation 342 and second column representation 344 (up to as many columns as there are related object sets). Report type creator 308 page may also include navigation links 345, which may include previous button 346, save button 348, save and select fields button 350, and cancel button 352. In other embodiments, report type creator 308 page may not have all of the elements listed and/or may have other elements instead of, or in addition to, those listed above.

There are several elements that appear in many of, or each of, FIGS. 3B-4G. In order to simplify the discussion of FIGS. 3B-4G, many of these elements will only be labeled and discussed in one or two of FIGS. 3B-4G, even though they also appear in others of FIGS. 3B-4G. Report type creator 308 may include a process of creating a report type that has a user interface that guides the user through the process of creating object relationships for a report type. This process may be referred to as a wizard (in other words, the wizard associated with report type creator 308 is a set of pages that are presented to the user, with which the user interacts to create the new report type). In an embodiment, an administrator may create a "Custom Report Type" as part of a setup mode that allows the administrator to configure several different aspects of a report type—including but not limited to the object relationships. Clicking the button to create a new Custom Report Type may start a 2-page "wizard" that captures essential information to establish a Custom Report Type record, for example. In an embodiment, the object relationships part (the cascading objects and diagram) are on step 2 of a 2-page wizard.

In an embodiment configurable relationship representation 321 is a mechanism for selecting a relationship between two or more data objects. The components of configurable relationship representation 321 may be chosen is a sequential order and may be displayed in a sequential cascading order (as shown in FIG. 3B). Configurable relationship representation 321 shows the relationship entered by the user. First label 322 indicates that the data object named below it is the first data object in the relationship. First object name 324 is a name associated with a first data object, which may be referred to as the focus of the report associated with the report type being created. To add first object name 324, a menu having names of data objects may be opened for selecting a data object to be added to the relationship. Initially, selecting one of the names of one of the data objects may cause the selected name to appear as first object name 324.

Operator name 326 includes an indication of the operation performed between the first data object and the second data object. For example, operator name 326 may include the word "with," which may indicate that a join operation will be performed joining the first data object with the second data object. Examples of other types of operators are discussed in conjunction with FIG. 4B. After first object name 324 has been added, one of the operations may be selected and the next data object may also be selected, which will eventually cause the selected operation to appear after the first object name 324 and before the second object name.

Second object name 328 is a name associated with the second data object. Object name 328 includes name 328a, which is the actual name of the object, and remove link 328b. Selecting remove link 328b may cause the removal of the last data object representation and/or operator that was entered. The wizard of report type creator 308 may divide the process of creating a report type into steps in which in each step a new operator data object pair is added to the relationship. However, in the first step just the first data object is added. For example, in an embodiment, selecting remove link 328b at any step removes the box associated with that step and brings the user back to the previous step. In an embodiment, there may also be a "Change" link on each prior box (e.g., the Names box having first object name 324) that allows the user to change the object (e.g., the data object associated with the "Report Type Focus" or the " . . . with related" term) without having to go back to a prior page and/or prior step in the wizard. The wizard will be discussed further in conjunction with FIGS. 4A-4C.

In an embodiment, first object name 324 is directly below object label 322, operator name 326 is diagonally below (and in that sense is in a cascaded positioning with respect to) first object name 324, and second object name 328 is directly below operator name 326. Alternatively, terms added to the relationship may be represented in another manner.

Although the relationship of FIG. 3B only includes two object names and one operator, the relationship may be more complex, and may include more objects (e.g., four objects) separated by operators. Some examples of other relationships appear in FIGS. 4A-4F, below. Other forms of entering a relationship could be used instead of configurable relationship representation 321.

Data representation 329 may be a diagram, such as a Venn diagram, that represents the relationship that results from the relationship of configurable relationship representation 321. The more complicated configurable relationship representation 321, the more complicated data representation 329 and result representation 324 may be. Each object name of configurable relationship representation 321 has a corresponding object representation in data representation 329.

First object representation 330 represents the set of data in a first data object. Second object representation 332 represents the set data in a second data object. The first object representation 330 and the second object representation 332 are located such that they overlap in a manner that may represent the amount of data that are in corresponding rows or records of the first data object representation and the second data object (i.e., the union set). In an embodiment, first object representation 330 and second object representation 332 may have oval shapes. The first object representation 330 and the second object representation 332 may have different colors to facilitate distinguishing one object representation from another. The oval shape facilitates showing the overlap of more than three representations of data objects.

Result representation 334 represents the data that is represented by configurable relationship representation 321. In other words, result representation represents the collection of data (which may be referred to as the set of data) that is selected by performing the operations of configurable relationship representation 321 on the data object representations as specified by configurable relationship representation 321. In the example of FIG. 3B, since the relationship is a natural join, result representation 334 may represent the rows or records of the data objects represented by first data representation 330 and second data representation 332, where a given row or record of the first data object shares an identifier with a corresponding row or record in the second data object. Portions of the data objects that make up data representation 329 may be uniformly shaded, colored, and/or cross hatch in order to indicate that those portions represent the data that is covered by the relationship.

Ordinarily a Venn diagram uses circles to depict collections of items and regions where to two or more circles overlap represent the items that are common to both collections. In contrast, in Venn diagrams of this specification, the overlap between geometric shapes that represent data objects represents the rows or records of one data object that are associated (e.g., linked via being joined) to the other data object, such as by sharing a common field having the same data. For example, a data object called Accounts may include a separate record for each of several accounts, and each record may have fields for an account number, a name of the account holder, and an account balance. Another data object may exist for Contacts, which may include a separate record for each contact, and each record may include fields for a name of an account holder, an address, and a phone number. The region of overlap between two geometric objects, one representing Accounts and one representing contacts, may represent those records in Accounts and in Cases that share the same data in their respective account holder fields. The data in the account holder fields may be used as identifiers of (which may also be referred to as keys for) the rows or records of the Accounts and Cases data objects.

Also, ordinarily in a Venn diagram if three circles overlap one another, the region common to all three circles represents items that are members of all three collections. In contrast to an ordinary Venn diagram (but similar to the Venn diagram for two data objects), in the current specification, when three geometric objects overlap one another, the region in common with all three geometric objects represents the rows and records that are shared by all the data objects that are represented by the geometric representations. Similar to the Venn diagram for two data objects, rows and records in common are the rows or records in the first data object that is associated (e.g., linked via being joined) with corresponding rows and records in the second data object, which in turn is associated with corresponding rows and records in the third data object. However, a complexity that exists in the Venn diagram for three or more data objects is there may not necessarily be a direct association from the rows in the first data object to rows in the third data object. For example, there may be another data object called Cases, in which each row or record may have a field for account numbers and a field for case numbers. Three overlapping geometric objects may represent the set of records that result when Cases is joined to Accounts (using the account numbers as a key) and when Accounts is also joined to Contacts (using account holder as a key) to form one report having Accounts, Contacts, and Cases. Although account numbers links Cases and Accounts and account holders links Accounts and contacts, there may not be any field, key or other data that directly links Cases to Contacts even though the Venn diagram shows a region shared by all three geometric objects. The shared region just represents the rows or records that result were all three data objects are joined (i.e. the rows or records for which both Cases and Accounts have the same entry for account number and both Accounts and Contacts have the same entry for account holder).

Icon 336, which may be an arrow, indicates that the there is a correspondence between data representation 329 and report representation 338. Icon 336 is optional.

Report representation 338 is a representation, such as a thumbnail image, of the report that is expected to result from the report type being created. First column representation 342 represents a block of data (each block of data may include one or more columns of data) of report representation 338 that corresponds to (e.g., that has data taken from) the data object that is represented by first object representation 330. Each column representation is itself a column in that each column representation is either a column of lines or a space where a column of lines could have been located and therefore has the shape of a column of lines. Second column representation 344 represents another block of data of report representation 338 that corresponds to (e.g. that has data taken from) the data object that is represented by second object representation 332. In an embodiment, the locations of first column representation 342 and second column representation 344 are indicative of the actual locations of the corresponding blocks of data in the actual report. First column representation 342 and the second column representation 344 may have the same coloring or a corresponding coloring as first object representation 330 and second object representation 332, respectively. Each line in each report representation represents one or more rows or records. Lines that are in different columns but at the same distance from the top (or bottom) of their respective columns of report representation 338 represent data that are in the same rows.

Thus, in the webpage associated with report type creator 308 (FIG. 3B), a selection mechanism (configurable relationship representation 321) is combined with a composite diagram. Placing data representation 329 and report representation 338 near one another (or at least on the same webpage) combines two relatively simple visual representations that, together, indicate a more complete story than either alone.

Specifically, without the combination of data representation 329 and report representation 338, when presented with the ability to select and relate data objects for the purpose of building reports, it can be difficult to understand the resulting data set and how it may be represented in a report. For example, if a user only sees a data representation 329 and if A is a data object named Accounts while B is a data object named Contacts, then the user may wonder what the difference is between selecting "Accounts" without specifying any further relationships and selecting "Accounts with and without Contacts." In both cases, all Account records are retrieved. In both cases result representation 334 would be the same and would indicate the same thing.

As a point of clarification, in this example, data representation 329 would be different for the two cases (selecting "Accounts" without specifying any further relationships and selecting "Accounts with and without Contacts"). Specifically, in the first case, data representation 329 would be only a shaded oval A, while in the second case data representation 329 would be a shaded oval A with an intersecting oval B. However, although data representation 329 would be different, the user may be confused by the difference, as a result of the result representation 334 being the same either way, because the user may associate result 334 as the only indication of the appearance of the final report. Further, the user may not immediately see how the intersecting oval B represents the difference in the appearance of the final report.

However, data representation 329 and a Venn diagram do not show that in the resulting report only some of the rows or records in the Accounts portion of the report would also have data in the Contact portion of the report. For all other Account rows or records, the Contact columns remain blank. In other words, the composite diagram (including data representation 329 and report representation 338), used in conjunction with a mechanism by which end users may select and relate objects to one another in patterns of inner and outer joins (e.g., "A with B", "A with and without (B without C)", and so on), illustrates (a) which records will be returned as the result of such relationships, and (b) how data records will be expressed in a tabular report. The diagram associated with the combination of data representation 329 and the report representation 338 illustrates both points. Data representation 329 communicates the set of records that are expected to be returned. Report representation 338 (e.g., a report thumbnail) communicates how these records relate to one another. The relationship may be communicated by the way in which the lines, representing report records, may appear in the columns in report representation 338 (e.g., by the fullness and/or emptiness of portions of the columns in report representation 338). In other words, the combination of data representation 329 and the report representation 338 illustrates the relation between the data objects indicating which records will be returned as the result of the selected relationships, and how data records will be expressed in a tabular report.

In an embodiment, data representation 329 and/or report representation 338 are updated with each new selection of another operator and object via configurable relationship representation 321. In other words, in this embodiment, data representation 329 and/or report representation 321 are updated dynamically. In an embodiment, data representation 329 and report representation 338 visually represent data sets returned as the result of relational database object joins for up to 4 sequentially joined objects. Not only does the combination of data representation 329 and report representation 338 help users understand the meaning and consequences of their selections, it has been observed (in usability testing) to encourage exploration and learning about what's possible with different relationship combinations.

In an embodiment, the colors used for data representation 329 and report representation 338 are compliant with 29 U.S.C. '794d, section 508 (1194.22), which is incorporated herein by reference. In an embodiment, a text of a plain-language explanation of the relationships being defined is provided to the user, which may enhance the understandability of data representation 329 and report representation 338.

In an embodiment, the colors chosen for different data object representations, such as first object representations 330 and second object representation 334 and for the different column representations, such as column representations 342 and 344 have a high contrast with respect to one another. Additionally or alternatively, the intensity of the colors may be chosen so that different colors appear as different shades, when viewed on a monochrome monitor and/or each data object representation and each column representation may include a legend (e.g., a letter of the alphabet, such as A, B, etc.) to facilitate being distinguished from one another by those who are color blind or do not have a color monitor. In this embodiment, the column representations and their corresponding data object representations may have the same legends for labeling elements associated with the same data object. For example, first object representation 330 and column representation 342 may both be labeled with the legend A, and second object representation 332 and column representation 344 may both be labeled with the legend B, thereby indicating that first object representation 330 corresponds to column representation 342, and second object representation 332 corresponds to column representation 344.

Navigation links 345 allow the user the select a variety of different activities. Previous button 346 allows the user to go to a previous webpage. In an embodiment selecting previous button 346 brings the user to a previous page of a "wizard." In an embodiment, the pages that the wizard presents to the user are labeled to indicate which "step" the user is in the midst of performing. In one example of this embodiment, previous button 346 causes a webpage to be displayed that represents the previous step, thereby taking the user back to the prior step without saving any object relationships that were made in the current step.

Save button 348 allows the user to save the current report type so that the current report type can be edited at a later time. In an embodiment, save button 348 causes the current report type to be added to the list of report types that can be selected via report type selector 306. In an embodiment, administrators are able to designate a report type as being "in development" as distinct from being "deployed." In an embodiment, end-users may select only those custom report types that are marked "deployed." Save and select fields button 350 may open a webpage that includes a mechanism for selecting which fields will be exposed to users when creating a report from this report type. Fields are selected from objects that were chosen via configurable relationship representation 321 (FIG. 3B) and/or any related lookup objects. Cancel 352 cancels the entry of the current report type.

Figure 4A:
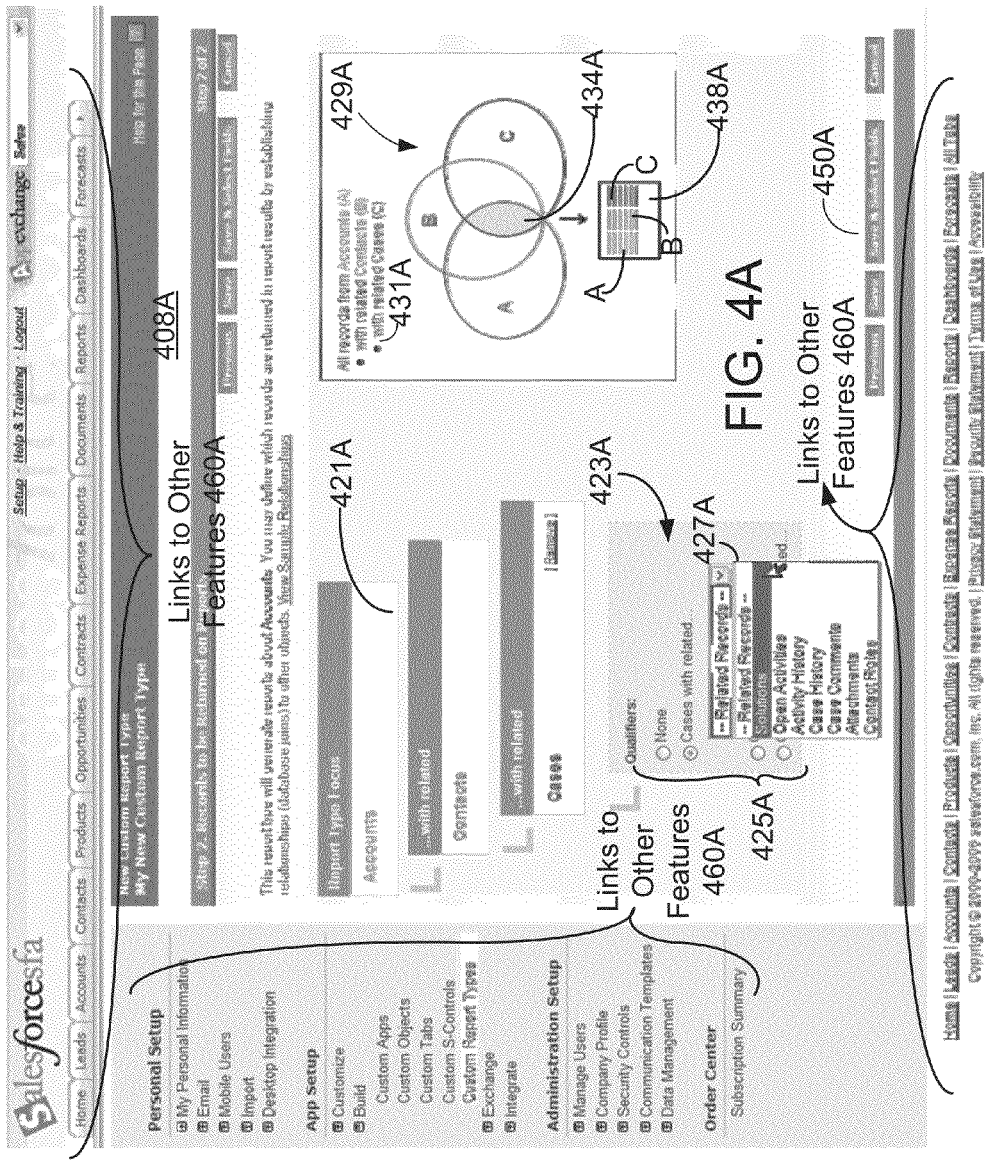
FIG. 4A is a screenshot of an example webpage excerpted from a report type creator being used to relate multiple objects.

FIG. 4A is a screenshot of an example of a report type creator page 408A being used to relate multiple objects. Report type creator page 408A includes a combination of configurable relationship representation 421A having section 423A with menu 425A and menu 427A, and data representation 429A accompanied with text 431A. Data representation 429A has result representation 434A. Report type creator page 408A also includes report representation 438A, save and select fields 450A, and links to other features 460A. In other embodiments, an equivalent screenshot of report type creator page 408A may not have all of the features listed and/or may have other features instead of, or in addition to, those listed above. In FIGS. 4A-4G features that are not discussed are not labeled to simplify the drawings.

In FIG. 4A, report type creator page 408A may be used to create a report type in which three data object representations are selected and related by join operators. Report type creator page 408A may be used for creating a report based on the relationship of A with B with C by entering the objects and operators via configurable relationship representation 421A. As an example, the relationship A with B with C may be Accounts with Contacts with Cases. Report type creator page 408A may be capable of displaying section 423A, which is a section of a webpage for selecting a qualifier (which may be an operator) and a data object. Section 423A may be opened automatically as soon as a user selects an object from previous step in configurable relationship representation 421A. Menu 425A is a list of qualifiers that the user may select while section 423A is open. For example, the user may be given the option of selecting a natural join via a "with" selection, a filter via a "without selection," or an outer left join via a "with and without" selection. Menu 427A allows the user to select a data object to which the selected qualifier is applied. In an embodiment, menu 427A is a pull down menu. In an embodiment, if appropriate, menu 427A appears below the qualifier selected from menu 425A1. Other examples are discussed in FIGS. 4A-4F showing the selection of other numbers of data objects related with other operations.

Data representation 429A is a Venn diagram of the relationship A with B with C in which each of data object representations A, B, and C may be represented by ovals. Text 431A compliments data representation 429A by including a text that states the relationship represented by data representation 429A. Text 431A is optional. In an embodiment, the names of the data objects specified in text 431A have the same coloring and/or shading as the corresponding data object representations A, B, and C (e.g., the same colors and/or shades as the corresponding ovals). Data representation 429A includes result representation 434A, which represents the portion of the data that is found in data object representations A, B, and C that corresponds to the relationship that is represented (which is A with B with C).

Report representation 438A has columns A, B, and C (which are columns of lines and) which correspond to ovals A, B, and C. Columns A, B, and C have lines in the same rows as one another that represent data entries in the same rows or records of the resulting report associated with the report type that are from each of the data objects associated with columns A, B, and C. Columns A, B, and C of report representation 438A (in addition to being columns of lines) are column representations of the columns in the report represented by report representation 438A. In an embodiment, report representation 438A has fewer lines in each column than result representation 338 (FIG. 3B), because A with B with C is expected to have less data than A with B (FIG. 3B) since there is expected to be fewer rows in data objects A, B, and C that each share the same identifier than rows in only data objects A and B that each share the same identifier.

Save and select fields 450A is the same as save and select fields 350, which was already described in conjunction with FIG. 3B. Save and select fields 450A may take an administrator to another page (where, as described above, the administrator selects which fields the end-users may select for use as columns in the end user's report. Links to other features 460A are links to other features of UI 30. The features that are linked by links to other features 460A may include other interface features 310 (FIG. 3A1). In the remaining screenshots the links to other features are not labeled to simplify the figures.

Figure 4B:
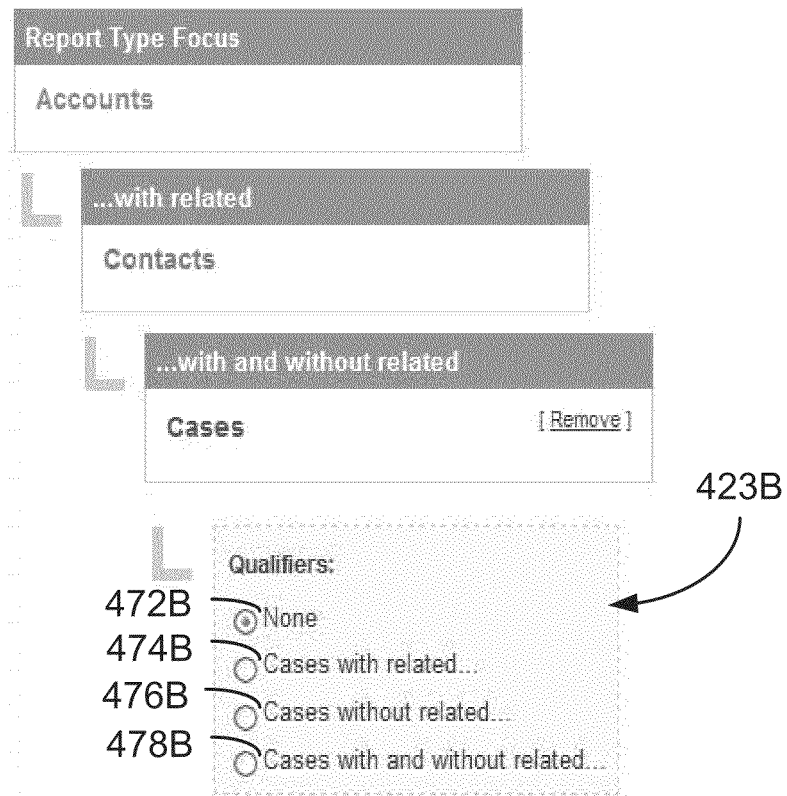
FIG. 4B shows a screenshot of an embodiment of a section of a webpage associated with the webpage of FIG. 4A.

FIG. 4B shows an embodiment of section 423B having none-selection 472B, with-selection 474B, without-selection 476B, and with-and-without-selection 478B. In other embodiments, an equivalent screenshot of section 423B may not have all of the features listed and/or may have other features instead of, or in addition to, those listed above.

Section 423B may be the same as section 423A. However, in FIG. 4B the pull down menu has not been activated, and consequently, with-selection 474B, without-selection 476B, and with-and-without-selection 478B are visible without obstruction from the pull down menu. None-selection 472B indicates that no further terms are to be added to the relationship. In an embodiment, none-selection 472B may be the default selection. In contrast, selecting with-selection 474B, without-selection 476B, or with-and-without-selection 478B opens a window for activating a pull down menu, such as menu 425A (FIG. 4A), via which a data object can be selected. In an embodiment, the pull down menu appears directly under the selection that was selected. Selecting with-selection 474B, without-selection 476B, or with-and-without-selection 478B allows the user to a add term in which the next operator is a with, without, or with-and-without operation, respectively.

Figure 4C:
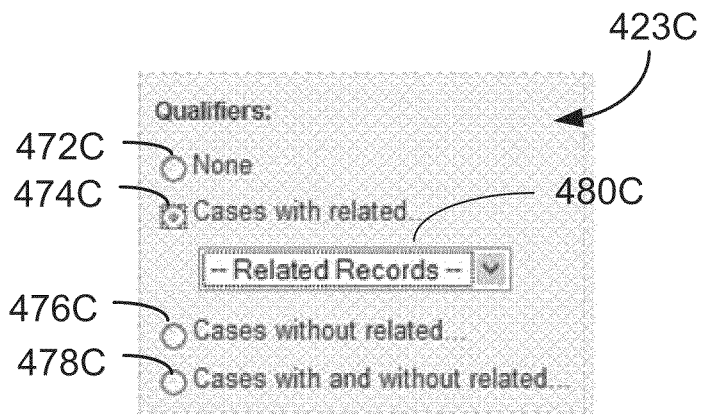
FIG. 4C shows a screenshot of an embodiment of a section of a webpage that results from interacting with the section of the webpage shown in FIG. 4B.

FIG. 4C shows an embodiment of section 423C having none-selection 472C, with-selection 474C, without-selection 476C, with-and-without-selection 478C, and pull-down menu 480C. In other embodiments, an equivalent screenshot of section 423B may not have all of the features listed and/or may have other features instead of, or in addition to, those listed above.

Section 423C, none-selection 472C, with-selection 474C, without-selection 476C, and with-and-without-selection 478C may be the same as section 423B, none-selection 472B, with-selection 474B, without-selection 476B, and with-and-without-selection 478B, respectively, which were described in conjunction with FIG. 4B, above. FIG. 4C is different from FIG. 4B in that with-selection 476C is selected instead of none-selection 472B or 472C. Upon selecting one of the selections (other than none-selection 472C or 472B), a pull-down menu 480C appears allowing the user to select a data object. Selecting the arrow on the side of pull-down menu 480C causes a menu of data objects, such as menu 427A (FIG. 4A), to open.

For example, after choosing "Accounts" on a previous wizard page of report type creator 308 or 408A, the user is brought to the current wizard page (FIG. 4A). The "Qualifiers" section, section 423A, 423B, or 423C allows the user to select a second object to relate to Accounts, with radio button options to show each type of relationship. Selecting the radio button for "Accounts with related . . . " exposes pull-down menu 480C. Upon selecting a value from the associated menu (menu 425A1 of FIG. 4A), the user causes the creation of a second object box plus the new qualifiers section (for adding an optional $3^{rd}$ object relationship). In the current example, first the user selects "Contacts." Continuing with this example, the steps of selecting a radio button and then selecting a data object from the menu that subsequently appears is repeated. In the next step, the " . . . with related" option is selected and "Cases" may also be selected. In an embodiment in which only 4 data objects can be selected, the user can add only another two data objects to the relationship shown in FIG. 3B.

Figure 4D:
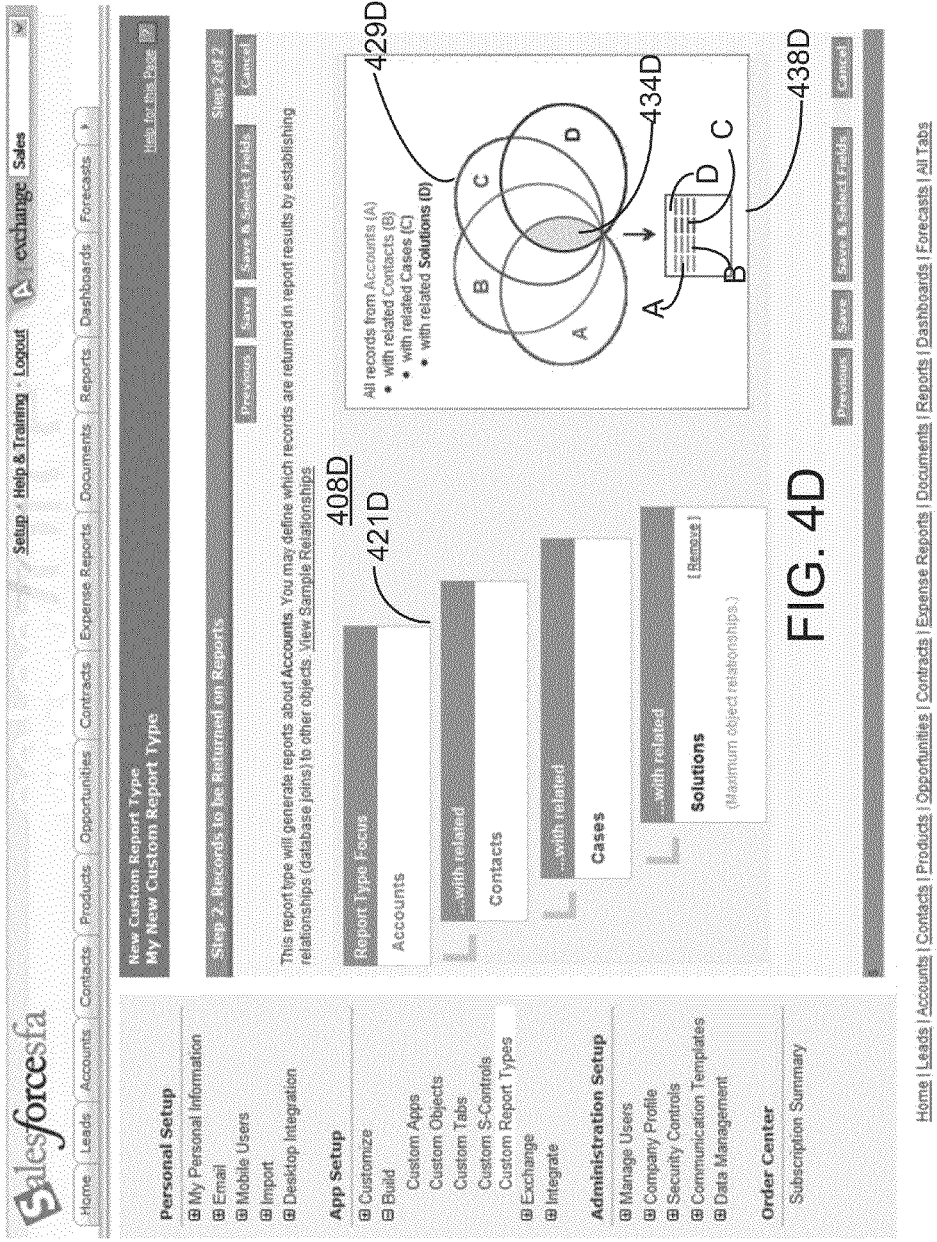
FIG. 4D is a screenshot of an example of a webpage excerpted from a report type creator being used to relate multiple objects.

FIG. 4D is a screenshot of an example of report type creator page 408D relating multiple objects. Report type creator page 408D includes a combination of configurable relationship representation 421D, data representation 429D having result representation 434D, and report representation 438D. In other embodiments, an equivalent screenshot of report type creator page 408D may not have all of the features listed and/or may have other features instead of, or in addition to, those listed above.

Report type creator page 408D may be used as an interface to create a report type that relates (e.g., joins) four data object representations. Report type creator page 408D may be used for creating a report based on the relationship of A with B with C with D by entering the objects and operators via configurable relationship representation 421D. As an example, the relationship A with B with C with D may be Accounts with Contacts with Cases with Solutions. Data representation 429D is a Venn diagram of the relationship A with B with C with D in which each of data object representations A, B, C, and D are represented by ovals, and result representation 434D represents corresponding rows of data object representations A, B, C, and D that are each associated with one another, such as by having a common identifier. Report representation 438D has columns A, B, C, and D, which correspond to ovals A, B, C, and D. Columns A, B, C, and D have lines in the same rows as one another representing entries in the same rows as one another in the resulting report representation 438D associated with the report type. Columns A, B, C, and D of report representation 438D are column representations of the columns in the report represented by report representation 438D. In an embodiment, result representation 434D has fewer lines in each column than result representation 334 (FIG. 3B) and 434A (FIG. 4A). For example, FIG. 4A shows 5 lines in each column, while each column of FIG. 4D shows 4 lines. The columns of a report resulting from the relationship A with B with C with D of FIG. 4D is expected to have less data than columns of a report represented by A, B, and C of FIG. 4A, because there is expected to be fewer rows having identifiers that are shared by A, B, C, and D than rows having identifiers that are shared by only A, B, and C or A and B (four data objects are likely to have fewer rows or records in common than three data objects or two data objects), and therefore columns A, B, C, and D of the report representation of FIG. 4D are represented as having fewer rows than A with B with C (FIG. 4A) or A with B (FIG. 3B).

Figure 4E:
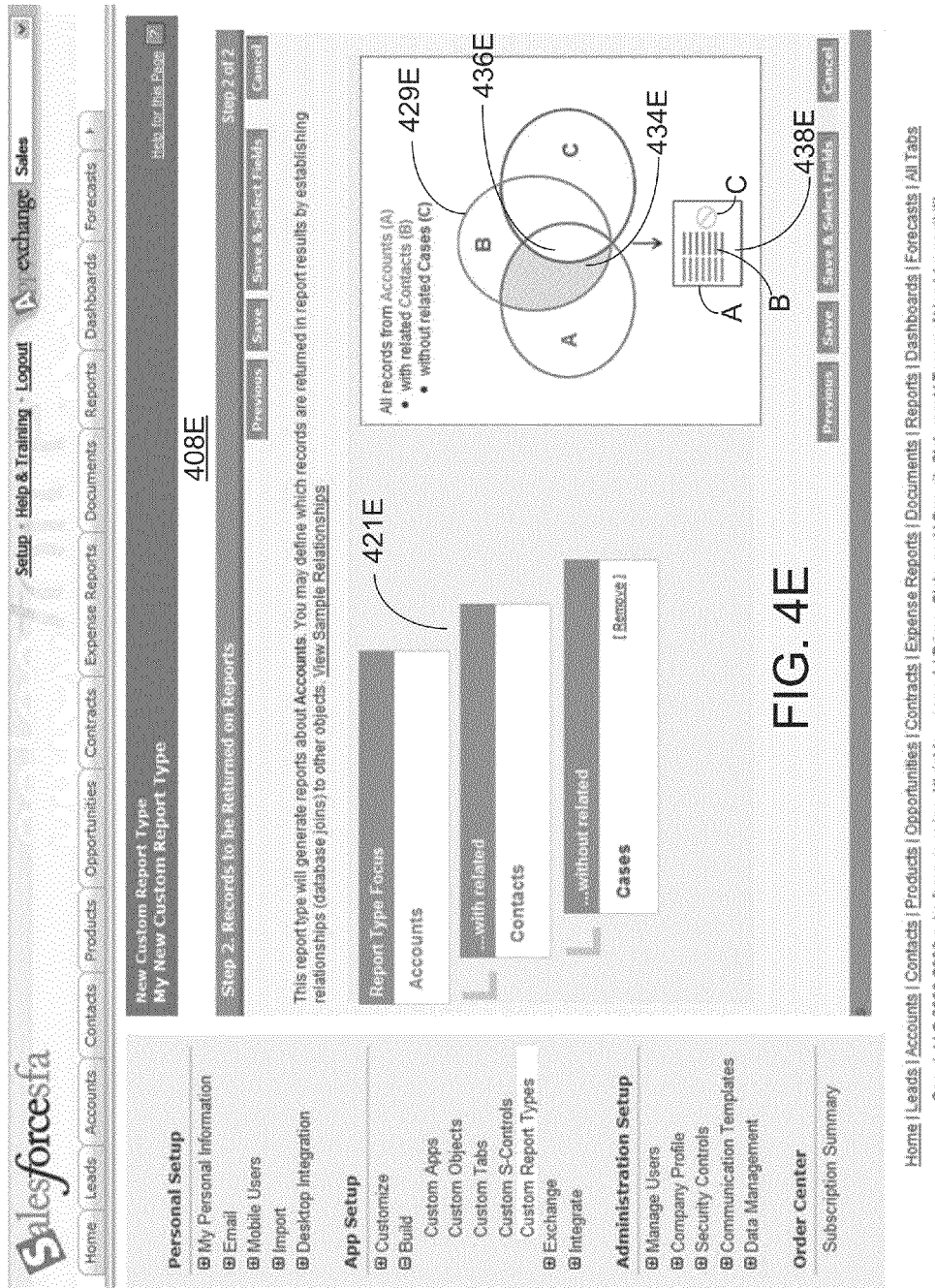
FIG. 4E is a screenshot of an example of a webpage excerpted from a report type creator.

FIG. 4E is a screenshot of an example report type creator page 408E being used to relate multiple data objects. Report type creator page 408E includes a combination of configurable relationship representation 421E, data representation 429E having result representation 434E and region 436E, and report representation 438E. In other embodiments, an equivalent screenshot of report type creator page 408E may not have all of the features listed and/or may have other features instead of, or in addition to, those listed above.

In FIG. 4E, report type creator page 408E shows a more complicated example of creating a report type than was shown by FIGS. 3B and 4A. In FIG. 4E, the relationship entered via configurable relationship representation 421E is A with B without C, which could be Accounts with Contacts without Cases. Data representation 421E is a Venn diagram in which data object representations A, B, and C are represented by ovals A, B, and C. The combination of result representation 434E and region 436E represents A with B. Region 436E is C's contribution to the relationship A with B. Thus, removing region 436E from A with B yields A with B without C, which is result representation 434E.

Report representation 438E includes columns A and B and a location for column C. Column A and column B each have lines in the same rows representing entries in the same rows or records of the report associated with the report type have entries that come from each of the data objects associated with columns A and B. In an embodiment, since no part of C appears in the final report, a null sign is placed in column C or at least in a space for column C of report representation 438E (the blank space, such as column C, set aside to indicate where a column of lines could have been located will also be referred to as a "column").

Figure 4F:
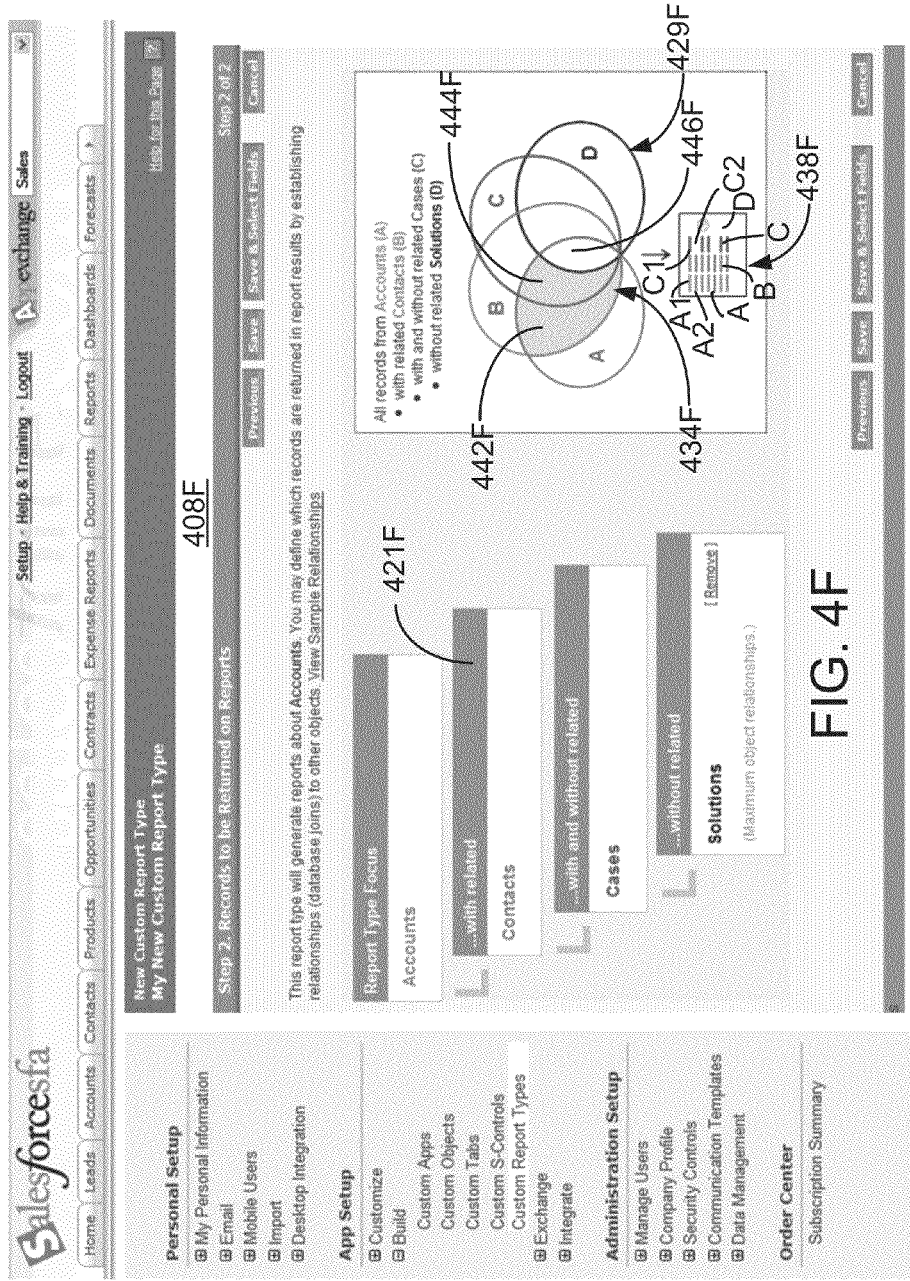
FIG. 4F is a screenshot of an example of a webpage excerpted from a report type creator.

FIG. 4F is a screenshot of an example of report type creator page 408F, which includes a combination of configurable relationship representation 421F and data representation 429F having result representation 434F, which includes regions 442F and 444F. Data representation 434F also includes region 446F. Report type creator page 408d also includes report representation 438F. In other embodiments, an equivalent screenshot of report type creator page 408F may not have all of the features listed and/or may have other features instead of, or in addition to, those listed above.

FIG. 4F shows an example in which, using report type creator page 408F, a report type is created having a relationship that is more complicated than that of FIGS. 4A, 4D, and 4E. In FIG. 4F, report type creator creates a report type having relationship A with B with and without C without D, which (as an example) could be Accounts with Contacts with and without Cases without Solutions.

In FIG. 4F, configurable relationship representation 421F was used to input the relationship A with B with and without C without D. Similarly, data representation 429F is a Venn diagram of A with B with and without C without D, and result representation 434F illustrates the data that is in corresponding rows of data object representations A and B and that are included in the report, which (in addition to being A with B with and with out C without D) is the same as the data that would be selected by the relationship A with B without D.

Region 442F would be A with B without C. Region 444F represents the data from C that was included within A with B without D (or A with B with and without C with D). Region 446F represents the data removed by the "without D" term of the relationship A with B with and without C without D. However, C's contribution does not affect the data that is included in A with B with and without C without D, and therefore does not affect the Venn diagram that is included in data representation 429F.

Report representation 438F shows column A having lines representing data that corresponds to the data object represented by object representation A and shows column B having lines representing data corresponding to the data object represented by object representation B. Every line in column A has a corresponding line in column B, and every line in column B has a corresponding line in column A, representing each row or record in the report associated with the report type having entries from both of the data objects associated with columns A and B, as a result of joining A and B using the "with" operator. In other words, similar to FIG. 4D (and in contrast to FIG. 4E), in FIG. 4F, report representation 438F further indicates that column A is based on the data object represented by object representation A, and column B is based on the data object represented by object representation B, while there is no column corresponding to the data object represented by object representation D (or stated differently, the column that would correspond to the data object represented by object representation D is left empty in report representation 438F).

In contrast to FIG. 4D (and similar to FIG. 4E), in FIG. 4F, there is a third column corresponding to the data object represented by object representation C, which is associated with Cases. Some of the lines in the third column of report representation 438F are missing, while other lines are present, indicating that there are some rows or records that have data and that do not have data in the portion of the resulting report that comes from the data object represented by object representation C have data. The third column of report representation 438F would not be present had the relationship not included the clause "with and without Cases." In contrast to data representation 429F, column C of report representation 438F shows the effect of specifying "with and without Cases."

Lines A1 and A2 are located in column A, and represent data (e.g., rows) that will appear in the report resulting from the report type. Line C1 represents data that would appear in the portion of the report represented by column C, which corresponds to the data represented by line A1 that is placed in the same row. Line C2 is a blank region (no line is present) in column C, indicating that no data for the data object represented by object representation C corresponds to the data represented by line A2 in column A. Blank locations, where there is no line, in a column of lines that make up a column representation may be referred to as a "blank line" or just as a "line."

Custom Report Type Detail Page Section

Figure 4G:
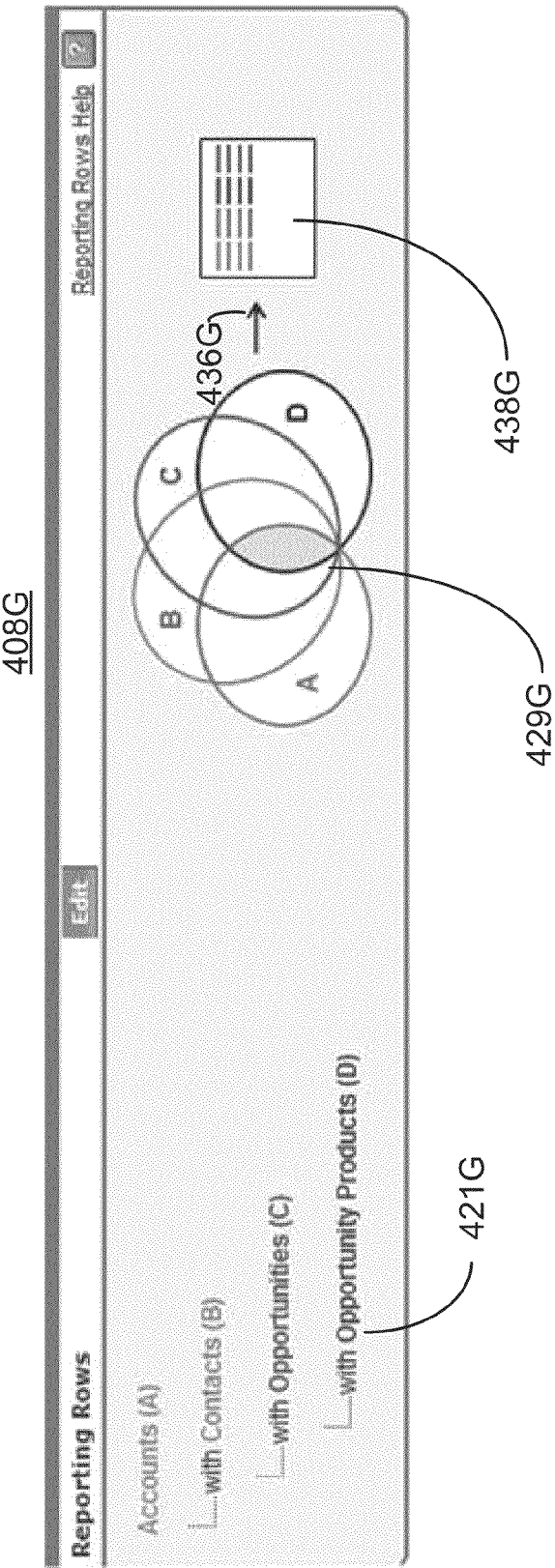
FIG. 4G shows an example of an excerpt from a custom report type detail page.

FIG. 4G shows an example of a detail page 408G including relationship representation 421G, data representation 429G, icon 436G, and report representation 438G. In other embodiments, an equivalent screenshot of a detail page 408G may not have all of the features listed and/or may have other features instead of, or in addition to, those listed above.

Detail page 408G can be access by the user, and allows the user to view the details of a report type that has already been created. Detail page 408G facilitates understanding the content of that will be included in a report created by the report type diagramed in detail page 408G. Data representation 429G may be the same as data representation 429D, and report representation 438G may be the same as report representation 438D, which were described above in conjunction with FIG. 4D.

In contrast to FIG. 4D, although both relationship representation 421G and 421D represent the same relationship, relationship representation 421G is a diagram of the terms of a relationship of a pre-existing report type. In contrast, configurable relationship representation 421D is used for inputting and creating the relationship and is created as part of inputting the relationship into system 16. Specifically, in an embodiment, after a first user creates a report type using report type creator 308, for example, the report type may now be visible and available for others to use in report type selector 306. However, when a second user selects the new report type, the second user may not necessarily know what the report type will look like or what data will be included. Consequently, an option is provided for the user to view information about what data is included in the report type and what the report will look like. Detail page 408G may be just one item that the user is able to view while using report type selector 306, and may assist the user in choosing which report type to select.

In contrast to FIGS. 4A-4F, in FIG. 4G, icon 436G and report representation 438G are to the side of data representation 429G instead of under relationship 429G to accommodate the space available. However, detail page 408G is not limited to the specific layout shown in FIG. 4G.

Method Performed at User System for Creating Report Type

FIG. 5A1 shows a flowchart of an example of a method 500 for producing the representations of relationships described in conjunction with FIGS. 3A1-4G. In step 502, a user, via user system 12 (FIGS. 1 and 2), requests a webpage for creating a report type. Step 502 may involve many steps and sub-steps and may involve several exchanges of information between system 16 and user system 12 (FIGS. 1 and 2). In particular, the first time during method 500 that step 502 is implemented, step 502 may be implemented differently than subsequent implementations of step 502. For example, during the first time during method 500 of implementing step 502, step 502 may include a user opening an application, such as a browser, for interacting with system 16 (FIGS. 1 and 2), and the browser sending a communication signal to system 16, and requesting a webpage via which a report type may be created. As part of the first execution of step 502, prior to requesting a webpage for entering a relationship, the user may request to see and/or interact with several different webpages via which the user may request, and in response system 16 may perform, a variety of functions that are otherwise unrelated to creating a relationship and/or report type. Even during subsequent implementations of step 502, step 502 may involve the user entering information via the browser or other application running on user system 12.

In step 504, user system 12 receives from system 16 a webpage associated with UI 30 (FIG. 2), such as a webpage similar to the webpages associated with FIGS. 3A1-4F, via which the user may create or modify a report type. As part of step 504, user system 12 displays the webpage received on the monitor of user system 12.

In step 506, the user decides which of the available links to select. For example, as part of step 506 the user may select remove-link 328 (if available), previous button 346, save button 348, save and select button 350, cancel button 352 (FIG. 3B), one of the tabs for other webpages shown in FIGS. 4A-4F, the back button on the user's browser, or any of a number of other inputs. The first time during a given invocation of method 500 that step 506 is implemented, there may not be any relationship to alter or that was entered, as of yet, and consequently, remove link 328 would not be available. Alternatively or additionally, one or more of other links may not be available. For example, if there is nothing to save (e.g., if this is the first time implementing step 506 during this invocation of method 500), save button 348 (FIG. 3B) may not be available for selection. At any point during method 500 that the user is able to make an entry, the user may be able to enter any combination of these and/or other inputs, thereby invoking step 506 or an equivalent step. Step 506 may involve user system 12 (FIGS. 1 and 2) displaying a section similar to section 423A, a window similar to pull-down menu 480C appearing in response to the selection, the user pulling down a menu similar to menu 425A1 causing the menu to appear, and the user selecting one of the data objects listed in the menu (a menu that is similar to menu 425A1). For simplicity, FIG. 5A1 only shows a few of the possible paths that may be initiated as a result of selecting one of the links (e.g., any of the links—such as the tabs and buttons—on the webpages associated with FIGS. 3D-4F) available during step 506. For example, if the user selects save and select button 350 (FIG. 3B), method 500 may proceed to step 508. Step 506 will be further described, below.

In step 508, a request is sent for a webpage that allows the administrator to select which report types are available to an end-user. There may be many different steps associated with step 508. For simplicity, none of the possible steps that may follow step 508 are discussed here, and therefore the edges of the box representing step 508 have been rounded.

If the user chooses to interact with configurable relationship representation 321, method 500 proceeds to step 510. Next, in step 510, as a result of interacting with configurable relationship representation 321, a request is sent for one or more fields and/or menus to be opened that allow the user to enter at least a portion of a relationship, such as a data object, an operator, or a combination of an operator followed by a data object. For example, during the first time implementing step 510 during the current implementation of method 500, the fields and/or menus requested by step 510 may be for the user to select the first data object. In an embodiment, during subsequent times implementing step 510 during method 500 (e.g., after the first data object has been entered), the fields and/or menus that are requested may be for the selection of operators followed by a selection of a data object.

In step 512, the one or more menus and/or fields are received from system 16 and received at user system 12. Steps 510 and 512 may be a series of steps in which multiple fields and/or menus are requested and received.

In step 514, the user is again presented with a chance to provide input, and accordingly, the user may select remove link 328b, previous button 346, save button 348, save and select button 350, cancel button 352 (FIG. 3B), one of the tabs for other webpages shown in FIGS. 4A-4F, the back button on the user's browser, or any of a number of other inputs. Step 514 may be essentially the same as step 506. As with step 506, not all of the possible links that may be selected at step 514 are discussed. However, there may be a somewhat different set of links that are available for selection at different points during method 500, depending on what has transpired prior to the current implementation of steps 506 and 514, respectively. For example, during step 514 save button 348 and save and select button 350 may not be available, because the user is in the middle of performing a selection. If the user decides to enter a data object or operator (via configurable relationship representation 321), method 500 proceeds to step 518. If in step 514, the user enters at least a portion of a relationship, the portion of the relationship may be entered via the browser on user system 12 and the one or more fields and/or menus, and correspondingly user system 12 receives the relationship entered. During the first time implementing step 514 during method 500, if entering a new relationship, a data object is entered. During the second and subsequent times implementing step 516, if the user chooses to add to the relationship, step 514 has several sub-steps, which are discussed in FIG. 5A2, below. For example, during the first implementation of step 516, the user may enter a data object, during the second implementation (during the same invocation of method 500) of the step 514, the user may enter an operator followed by a second data object using the method of FIG. 5A2. Step 514 is described further, below.

In step 518, user system 12 sends to system 16 the part of the relationship that was entered in step 514 but was not already sent to system 16, and then method 500 returns to step 502, where a request is sent for an updated webpage showing the relationship or the portion of the relationship entered so far, which may include an updated data representations 329 and report representation 338, thereby dynamically updating data representations 329 and report representation 338.

In an embodiment, if during step 506 the user selects remove link 528b, the method may proceed to step 518. In step 518, a request is sent from user system 12 to system 16 (FIGS. 1 and 2) to remove the most recent portion of the relationship that was entered. After step 518, method 500 proceeds to step 502, where a request for an updated webpage is sent from user system 12 to system 16, and then in step 504 an updated webpage is received as user system 12 that does not have the portion of the relationship that was removed as a result of selection remove link 528B.

Returning to step 506 or 514, if the user chooses save button 348 (FIG. 3B), method 500 may proceed to step 520, where a request is sent to system 16 (FIGS. 1 and 2) to save the relationship that was entered so far. In an embodiment, step 520 may involve sending a message to system 16 that may cause system 16 to save the report type created so far and add the report type created to the list of report types associated with report type selector 306, so that the new report type is available for selection via report type selector 306 (FIG. 3A1). If this is the first time implementing step 520 during the current invocation of method 500, there may be nothing to save. In an embodiment, step 520 may send a request to system 16 to invoke, or a request that may cause system 16 to invoke, one of save routines 38 (FIG. 2). In an embodiment, a message is sent to create a report type that is based on the entries made up until this point in executing method 500.

After step 520, method 500 returns to step 506, where another selection may be made.

Returning to step 506 or 514, if the user selects cancel 352 (FIG. 3B), method 500 proceeds to step 524 without saving the report type, and in step 524 method 500 is terminated. Terminating method 500 may close the webpage associated with report type creator 308 (FIG. 3A1 or 3B) and bring the user to a prior webpage.

Returning to step 506 or 514, if the user selects previous button 346 (FIG. 3B), the user may be brought to a prior point in method 500, which may be equivalent to sending the remove request of step 518. Selecting previous button 346 (FIG. 3B) may bring the user to a prior webpage.

In an embodiment, each of the steps of method 500 is a distinct step. In another embodiment, although depicted as distinct steps in FIG. 5A1, steps 502-524 and/or the sub-steps that will be described in FIG. 5A2 may not be distinct steps, but instead different parts of the various steps are performed with parts of other steps. In other embodiments, method 500 may not have all of the above steps and/or sub-steps of the method of FIG. 5A2 and/or may have other steps in addition to or instead of those listed above and/or in FIG. 5A2. The steps of method 500 and/or of FIG. 5A2 may be performed in another order. Any combination of steps and subsets of the steps listed above as part of method 500 and/or in FIG. 5A2 may be used to form their own method.

FIG. 5A2 shows a flowchart of an example of a method 514a for implementing step 514. The steps of method 514a are sub-steps of step 514. Steps of the method may include entering an operator in step 514b, sending the entry to system 16 in step 514c, receiving an updated webpage showing the entry and showing a menu for entering a data object in step 514d, and selecting a data object in step 514e. At steps 514b and 514d, the user has a choice of entering any of a remove 328b, previous 346, or cancel 352 instead of entering an operator in step 514b or a data object in step 514e. At step 514d, the user also has a choice of entering a save 348 or a save and select new field 350. If any of remove 328b, previous 346, cancel 352, save 348 or save and select new field 350 are selected control is transferred according to the path of method 500 indicated in FIG. 5A1.

Method Performed at On Demand Database System for Creating Report Type

FIG. 5B1 shows a flowchart for method 540, which is an example of a method for creating a report type that is performed at system 16 (FIGS. 1 and 2). Method 540 complements method 500. Specifically, at each step where method 500 sends a message, method 540 receives the message sent, and at each step where method 500 receives a message from system 16, the message received was sent by method 540.

In step 542, system 16 receives a request for a webpage from user system 12 (FIGS. 1 and 2) as a result of step 502 of method 500 being executed. The webpage requested includes features for creating a report type. In step 544, system 16 sends the webpage requested, which is received in step 504 of method 500.

In step 546, system 16 receives the next message from user system 12 (FIGS. 1 and 2) as a result of step 506 of method 500. In step 548, system 16 determines the content of the message sent by user system 12. If in step 548, system 16 determines that a save and select fields was selected, method 540 proceeds to step 550. In step 550, a request for the page that allows an administrator to choose which report types are available to the end user (if the end-user does not have the authorization of an administrator, the request is not honored). There may be many different steps associated with step 550. For simplicity, none of the possible steps that may follow step 550 are discussed here, and therefore the edges of the box representing step 550 have been rounded. If in step 548 a request for a new filed selector is received, method 540 proceeds to step 552. In step 552, a new field selector is sent from system 16 to user system 12. For example, one or more fields and/or menus may be sent for display on user system 12 (e.g., by updating the webpage being displayed). In step 554, system 16 receives a message sent from user system 12 as a result of step 514 of method 500. In step 556, system 16 determines what message was sent. Steps 548 and 556 may be essentially the same as one another. The combination of steps 546 and 548 of method 540 is the response to step 506 of method 500, and the combination of steps 554 and 556 of method 540 is the response to step 514 of method 500. If in step 556 it is determined that a portion of a relationship was sent, method 540 continues with step 560. In step 560, a new data representation 329 (FIG. 3B) is computed. Next in step 562, a new report representation 338 (FIG. 3B) is computed. Optionally, a new configurable relationship representation 321 (FIG. 3B) is computed by system 16 (if user system 12 did not already update configurable relationship representation 321. After step 562, method 540 returns to step 544, where an updated webpage is sent having an updated data representation 329 and an updated report representation 338, thereby dynamically updating data representation 329 and report representation 338.

Returning to step 548 or 556, if system 16 (FIGS. 1 and 2) receives a save request, method 540 may proceed to step 564, where the relationship entered so far is saved by system 16. In an embodiment, step 564 may involve saving the report type created, so far, and adding the report type created to a list of report types associated with report type creator 306 (FIG. 3A1), so that the new report type is available for selection via report type selector 306. After step 564, method 540 returns to step 546, and waits to receive the next message from user system 12 (FIGS. 1 and 2).

Returning to step 548 or 556, if system 16 (FIGS. 1 and 2) receives a cancel request as a result of cancel button 352 (FIG. 3B) being pressed, method 540 proceeds to step 566 without saving the report type, and in step 566 method 500 is terminated. Terminating method 500 may close the webpage associated with report type creator 308 and bring the user to a prior webpage.

Returning to step 548 or 556, if a request for a previous page is received at system 16 (e.g., as a result of the user selects previous button 346 of FIG. 3B), system 16 (FIGS. 1 and 2) may return to a prior point in method 540, which may be equivalent to removing an entry of the relationship characterizing the report type being created. Receiving a request for a previous page may cause system 16 to return to a prior webpage, and may initiate step 566 terminating method 540.

In an embodiment, each of the steps of method 540 and/or the sub-steps that will be described in FIGS. 5B2, 5C and/or 5D is a distinct step. In another embodiment, although depicted as distinct steps in FIG. 5B1, steps 542-568 and/or the sub-steps that will be described in FIGS. 5B2, 5C and/or 5D may not be distinct steps, but instead different parts of the various steps are performed with parts of other steps. In other embodiments, method 540 and/or the methods of FIGS. 5B2, 5C and/or 5D may not have all of the above steps and sub-steps and/or may have other steps and/or sub-steps in addition to or instead of those listed above. The steps of method 540 and/or the methods of FIGS. 5B2, 5C and/or 5D may be performed in another order. Any combination of steps and subsets of the steps listed above as part of method 540 and/or the methods of FIGS. 5B2, 5C and/or 5D may be used to form their own method.

FIG. 5B2 shows a flowchart of an example of a method 556a for implementing step 556. The steps of method 556a are sub-steps of step 556. The steps of the method 556a may include receiving a message at system 16 in step 556b, determining whether the message is a choice of an operator or another message in step 556c, if an operator was sent, sending an updated webpage showing the selection of the operator and showing a menu for entering a data object in step 556d, and selecting a data object in step 556e. At steps 556b and 556d, the user has a choice of entering any of a remove 328b, previous 346, or cancel 352 instead of entering an operator in step 556b or a data object in step 556e. At step 556d, the user also has a choice of entering a save 348 or a save and select new field 350. If any of remove 328b, previous 346, cancel 352, save 348 or save and select new field 350 are selected control is transferred according to the indicated path in 556 in FIG. 5B1.

Figure 5C:
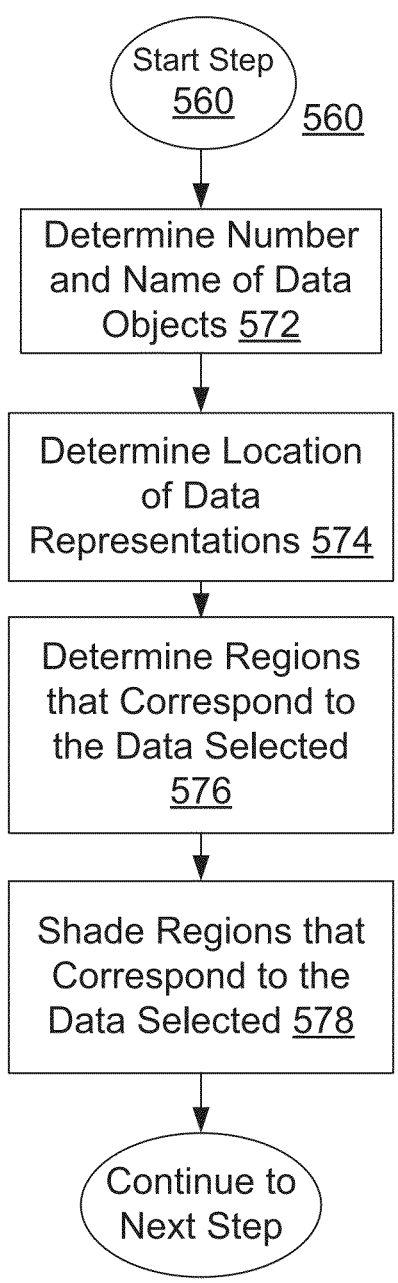
FIG. 5C shows a flowchart of an example of a method for carrying out one of the steps of FIG. 5B1.

FIG. 5C shows a flowchart of an example of a method for carrying out step 560. The following steps are sub-steps of step 560. In step 572, the number and names of the data objects selected so far are determined. In step 574, locations on a webpage are determined for the data object representations, such as data object representations A-D (FIGS. 3B-4G). In step 576, locations are determined within the data object representations that correspond to the data selected by the relationship. In step 578, images of the data object representations are produced, and the portions of the data object representations that correspond to the data selected are shaded according to the determination made in step 576. Step 578 is the last sub-step of step 560. After step 578 (the last sub-step of step 560) terminates, and method 540 continues to step 562.

Figure 5D:
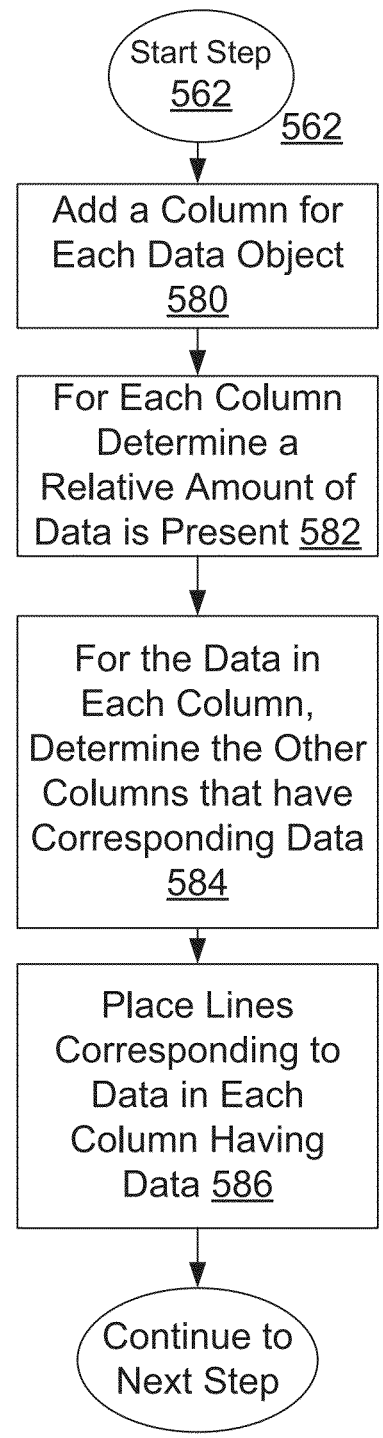
FIG. 5D shows a flowchart of an example of a method for carrying out one of the steps of FIG. 5B1.

FIG. 5D shows a flowchart of an example of a method for carrying out step 562. The following steps are sub-steps of step 562. In step 580, a column is added to report representation 338 (FIG. 3B) for each data object. In step 582, for each column a determination is made as to a relative amount of data (e.g., the relative number of rows) that will be selected. In other words, in an embodiment, a determination is made as to how much data will be selected compared to the total amount of data available. Additionally, in an embodiment, for each column a determination is made as to whether more data will be selected than the amount of data selected that will appear in the portion of the resulting report represented by the other columns.

In step 584, for each column a determination is made as to whether the portion of the report that is represented by that column has data. Stated differently, for each line of the column a determination is made as to whether there is no data in the rows or records corresponding to that line, where that line corresponds to a line that is present in another column of report representation 338. Using this information, in each column regions are determined that correspond to no data being present and regions are determined that correspond to data being present. For example, depending on the relationship, some columns of report representation 338 may be determined to correspond to portions of a report that will be completely full with data, and some columns of report representation 338 may be determined to correspond to portions of the report that will have no data (and therefore those portions of the columns do not include any lines). For some relationships there may be some columns that have regions that correspond to portions of the report that will have no data and that correspond to regions (by being part of the same rows or records of the report associated with the report type) in other columns that in turn correspond to portions of the report that will have data (and therefore the column of report representation 338 has no lines at a position where another column of report representation 338 has lines).

In step 586, images of each of the columns of the report representation are produced, having lines in regions of the columns that correspond to regions of the report that have data and having regions without lines that correspond to regions of the report that do not have data, such that regions of two columns associated with corresponding data have corresponding lines at the same distance from the top (or from the bottom) of their respective columns. After step 586 (the last sub-step of step 562), step 562 terminates.

Method for Using the Environment (FIGS. 1 and 2)

Figure 6:
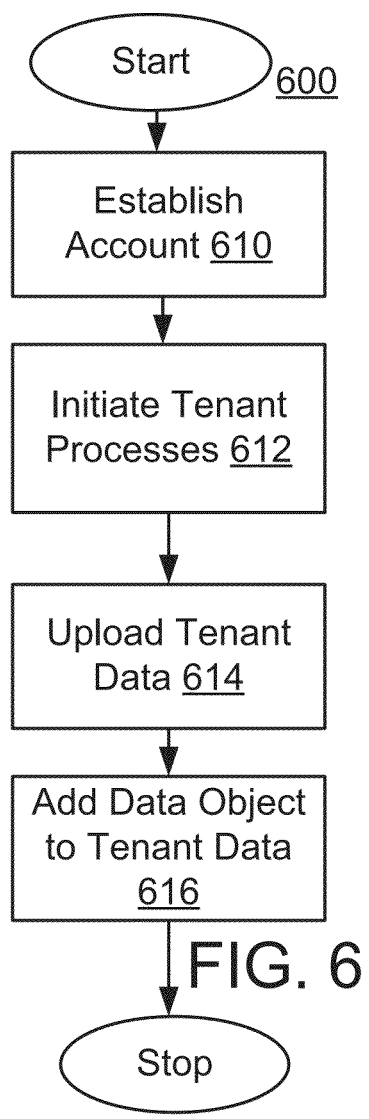
FIG. 6 shows a flowchart of an example of a method of using the environment of FIG. 1.

FIG. 6 shows a flowchart of an example of a method 600 of using environment 10. In step 610, user system 12 (FIGS. 1 and 2) establishes an account. In step 612, one more tenant process space 104 (FIG. 2) are initiated on behalf of user system 12, which may also involve setting aside space in tenant space 112 (FIG. 2) and tenant data 114 (FIG. 2) for user system 12. Step 612 may also involve modifying application metadata to accommodate user system 12. In step 614, user system 12 uploads data. In step 616, one or more data objects are added to tenant data 114 where the data uploaded is stored. In step 618, method 500 (FIG. 5A1), 540 (FIG. 5B1), 552 (FIG. 5C) and/or 554 (FIG. 5D) may be implemented.

Method for Creating the Environment (FIGS. 1 and 2)

Figure 7:
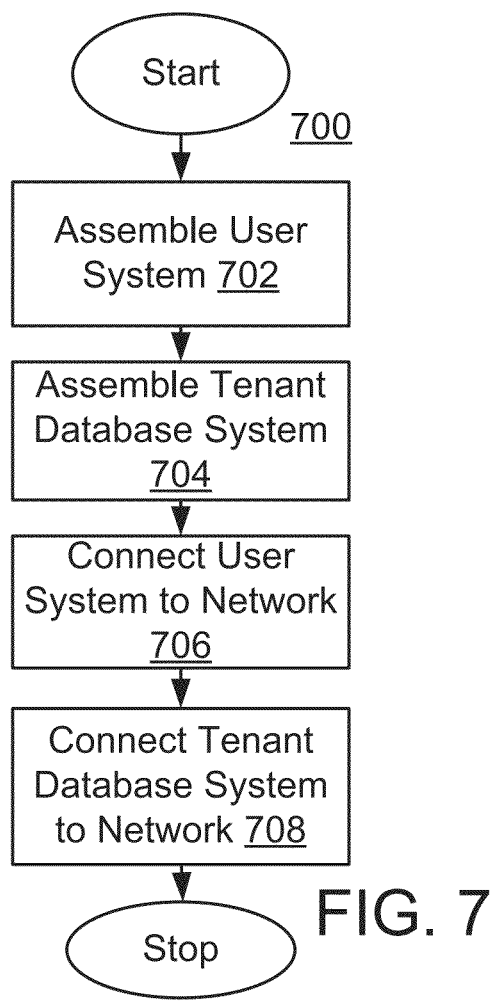
FIG. 7 is a method of making the environment of FIG. 1.

FIG. 7 is a method of making environment 10, in step 702, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100$_1$-100$_N$, system process space 102, tenant process spaces 104, tenant management process space 110, tenant space 112, tenant data 114, and application metadata 116 (FIG. 2).

In step 706, user system 12 is communicatively coupled to network 104. In step 708, system 16 is communicatively coupled to network 104 allowing user system 12 and system 16 to communicate with one another (FIG. 2). In step 710, one or more instructions may be installed in system 16 (e.g., the instructions may be installed on one or more machine readable media, such as computer readable media, therein) and/or system 16 is otherwise configured for performing the steps of methods 500 (FIG. 5A1), 540 (FIG. 5B1), 552 (FIG. 5C), 554 (FIG. 5D) and/or method 600 (FIG. 6). For example, as part of step 710, one or more instructions may be entered into the memory of system 16 for receiving a relationship and preparing a relationship representation based on the relationship received. Also, as part of step 710, one or more instructions may be entered into system 16 for preparing data representations, such as a Venn diagram. Additionally, as part of step 710, one or more instructions may be entered into system 16 for preparing report representations, such as a thumbnail diagram of a report. As another part of step 710, one or more instructions may be entered into system 16 for creating a report type based on the relationship entered and adding the report type. As part of step 710, program code 26 may be modified by the addition of instructions associated with report type creator 308. In optional step 712, software (e.g., a cookie) is installed on user system 12 to facilitate carrying out the steps of methods 500 (FIG. 5A1), 540 (FIG. 5B1), 552 (FIG. 5C), 554 (FIG. 5D) and/or method 600 (FIG. 6).

Extensions and Alternatives

Although examples of the invention are described above, the invention is not limited to the details of these examples. For example, while interacting with configurable relationship representation 321, the user may be able to select from a variety of different types of joins, such as (cross join, inner join, full outer join, natural join, left outer join, right outer join, or another operation). Instead of configurable relationship representation 321 (FIG. 3B), the relationship may be entered by entering text into a single text field. Alternatively, there may be separate text fields or menus for a finite number of data objects that are separated by text fields or menus for selecting a join and/or other operation in which each text field or menu is always revealed. The text field could be lined up in a column or a row, and there may be an icon for adding more text fields for entering more data objects. In alternative embodiments, it may be possible to specify the columns (e.g., a key or a set of unique identifiers of rows or records) of each data object that is used for performing the join operation. In configurable relationship representation 321 words, such as "and," "join," or another term, may be used instead of the word "with" to indicate that a join operation will be performed. Other words may be used to indicate other types of operations.

Instead of presenting the operator names and object names in the cascaded configuration shown in FIG. 3B, for example, first object name 324 may be located directly below object label 322, operator name 326 may be located directly below first object name 324, and second object name 328 may be located directly below operator name 326. In yet another embodiment, first object name 324 is located at the side of object label 322, operator name 326 is located at the side of first object name 324, and second object name 328 is located at the side of operator name 326. In an embodiment, when specifying a data object name and/or when specifying an operator a filter may be applied. For example, when specifying object name 328*a*, the user may be able to also specify that only data within a specified date range is included in from that data object.

In an embodiment, instead of using Venn diagram for the data representation 329, another type of diagram and/or graph may be used, such as Euler diagrams, Pierce Diagrams, Karnaugh maps, Edward's Venn diagram and/or other graphs or diagrams may be used to represent the data that will be retrieved by the relationship. In other embodiments, in data representation 329 shapes other than ovals may be used for representing the data objects. For example, the data objects may be represented by squares, diamonds, rectangles, circles, triangles, hexagons, octagons, trapezoids, rhombuses, other polygons, stars, or other shapes. Instead of each of the representations of data objects having no fill, each of the representations of data objects may have different colored and/or different patterned fills. Instead of using different colors to distinguish the different representations of data objects from one another, different shades, different line widths, and/or different line types (e.g. dotted, dashed and/or mixtures of dots and dashes) may be. The colors of the data object representations (e.g., the ovals) may be chosen to have a wavelength that is as far from the wavelength of another color as is reasonable for the number of objects chosen, and/or are not colors that are commonly confused by those that have mild forms of color blindness (e.g., those that cannot distinguish between close wavelengths of red and orange, orange and yellow, yellow and green, and/or blue and green).

In an embodiment, the data representation 329 and/or the report representation 338 are used for representing the data retrieved by a database query (such as a SQL query) that may be unrelated to creating a report type. In an embodiment, the user may be able to create and/or view relationship representations 329 and/or report representations 338 that are based on more than 4 data objects. In an embodiment, there may be an option for viewing a blowup of the data representation 329 and/or the report representation 338 on a screen that is separate from the rest of the webpages of FIGS. 3B-4G.

In an embodiment, instead of using an arrow for icon 336 (FIG. 3B) another icon may be used, such as a straight line without any arrowheads, or a line of three dots. Instead of using an arrow with one head at one end, an arrow having two heads, one at each end may be used. In an embodiment, selecting previous button 346 (FIG. 3B) may bring the user to a previous webpage that is not part of report type creator 346, which may thereby terminate the entry of the new report type, bring the user to a webpage that allows the user to modify a prior report type, or bring the user to a webpage in which the report type has fewer terms. In an embodiment, selecting cancel 352 may cause the webpage of FIG. 3 to close.

As an example, returning to FIG. 4A, instead of section 423A (or an equivalent section) appearing in response to selecting save and select fields 350 (FIG. 3B), clicking on one or more regions of UI 30 (such as the region where first object name 324 appears, FIG. 3B) may cause a menu of available data object names to appear, each data object name being the name of a data object that was created during prior operations. Instead of, or in addition to, using a webpage section, such as section 423A, there may be a tab, button, or other link on UI 30 (FIG. 2) that is always visible that causes a menu of available data object names to appear. Alternatively or additionally to a webpage section, such as section 423A, there may be a tab, button, or other link on UI 30 that causes a menu of available data object names to appear that is separate from the selection of an operation. In this embodiment first a menu is opened for selecting an operation. After the operation is selected a menu may be opened for selecting a data object. Once the menu is open, one of the names of the data objects may be selected, causing the selected name to appear as the next object name of a relationship. Instead of using section such as section 423A, clicking on one or more regions of UI 30 (such as the region where operator name 326 appears, FIG. 3B) may cause a menu of available operations to appear.

Regarding methods 500 (FIG. 5A1) and 540 (FIG. 5B1), in an embodiment, instead of data representation 329 and report representation 338 updating dynamically with the addition of each term of the relationship, data representation 329 and report representation 338 may update only after the entire relationship is entered and/or in response to the user selecting an icon and/or entering another indication that the relationship should be updated (FIG. 3B). In an alternative embodiment, any or all of the steps method 540 (FIG. 5B1) may be performed on user system 12 instead of on system 16 (FIGS. 1 and 2), and after a report type is created and/or after methods 500 (FIG. 5A1) and 540 have terminated, the report type that was created is sent to, and saved on, system 16.

Regarding step 506 (FIG. 5A1) and step 548 (FIG. 5B1), in an embodiment, it may be possible for the user to proceed directly from step 506 to step 510 or from step 548 to 552, without first saving anything. For example, a click of a mouse on a particular portion of the screen of the user system 12 (FIGS. 1 and 2) may open the one or more menus and/or fields that allow a portion of a relationship to be entered without the relationship or report type being saved.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing an interface for object relationships, comprising:
    (a) receiving, at a host system from a user machine that is remote from the host system, a selection of at least a first object and a second object stored in an on-demand database service on a memory system of the host system and a definition of at least one relationship between the first object and the second object;
    (b) providing, to the user machine, based upon the at least one relationship between the first object and the second object, a diagram pictorially illustrating the at least one relationship; and
    (c) providing, to the user machine, a pictorial representation of a report that illustrates the at least one relationship, the pictorial representation having a visual appearance suggestive of a report; the pictorial representation not being the report; and the pictorial representation of the report being different than the diagram;
    (d) providing, to the user machine, in association with the pictorial representation of the report and the diagram, a representation of choices of data relationships, the representation of choices including at least one or more links for accepting user input, and a configurable hierarchical arrangement of selected relationships;
    (e) receiving, at the host system, user input at the server via the one or more links;
    (f) computing a new arrangement that is an update to the configurable hierarchical arrangement, an update to the diagram, and an update to the pictorial representation of the report;
    (g) providing to the user machine the update to the diagram, the update to the pictorial representation of the report and the new arrangement in association with the diagram and the pictorial indication.

2. The method of claim 1, the first database object and the second database object being part of a collection of at least two database objects, and the providing of the diagram includes:

determining data in the first database object that is associated with data in the second database object, if any associated data exists, determining locations within the diagram for placing representations of the first database object and the second database object the locations resulting in if the first database object and the second database object have data that is associated, two corresponding representations are located in a manner in which the two corresponding representations overlap one another; and determining locations of portions within the representations of the related database objects that correspond to a data set resulting from applying the at least one relationship.

3. The method of claim 1, the first database object and the second database object being part of a collection of at least two database objects, and the providing of the diagram includes:

determining data within different database objects of the collection that is associated, if any exists.

4. The method of claim 1, the first database object and the second database object being part of a collection of at least two database objects, and the providing of the diagram includes:

determining locations within the diagram for placing representations of at least the first database object and the second database object.

5. The method of claim 1, the first database object and the second database object being part of a collection of at least two database objects, and the determining of the locations includes:

if two database objects have data that is associated, two corresponding representations are located in a manner in which the two corresponding representations overlap one another.

6. The method of claim 5, the determining of the locations further includes:

if two database objects do not have associated data, two corresponding representations are located in a manner in which the two corresponding representations do not overlap one another.

7. The method of claim 1, the first database object and the second database object being part of a collection of at least two database objects, and the providing of the diagram includes:

determining locations of portions within the representations of the related database objects that correspond to the data set resulting from applying the at least one relationship, and providing a visual indication of the portions.

8. The method of claim 1, the further providing an icon of an arrow pointing from the diagram to the pictorial representation, the diagram having an appearance of a Venn diagram.

9. The method of claim 1, further comprising: providing a text expressing the relationship; and the providing of the diagram includes providing a diagram having an appearance of a Venn diagram which includes at least locating at least two ovals on a webpage, the two ovals including the first oval representing the first database object and a second oval representing the second database object, the locating of the at least two ovals including placing the at least two ovals such that the first oval overlaps the second oval, shading a portion of the at least two ovals, such that the portions shaded indicate data that the relationship selects.

10. The method of claim 1, wherein the database is an on-demand relational database service capable of supporting multiple tenants.

11. The method of claim 1, wherein the diagram is provided prior to generating the report, allowing the user to decide whether to generate the report based on the diagram and the pictorial indication; the generating of the report including applying the at least one relationship to the first object and the second object; and arranging the resulting data set into a report.

12. A method for providing an interface for database object relationships, comprising:

(a) receiving, at a host system, from a user machine, a selection of at least a first database object and a second database object stored on a non-transitory computer readable medium of a memory system of the host system that is at a location that is remote from the user machine, in an on-demand relational database service and a definition of at least one relationship between the first database object and the second database object; and (b) causing a processor system of the host system to provide, based upon the at least one relationship between the first database object and the second database object, a diagram pictorially illustrating the at least one relationship;

the first database object being represented by the host system by a first graphical representation;

the second database object being represented by the host system by a second graphical representation;

if the first database object has database records that are associated with database records of the second database object, the first graphical representation is positioned, by the host system, to have a region that overlaps a region of the second graphical representation;

if the records of the first database object that are associated with the records of the second database object, which are represented by the overlap, are not identical to the records of the second database object;

if the first object has records that are not associated with records of the second object, the first graphical representation is positioned, by the host system, to have a region that does not overlap any region of the second graphical representation;

providing, by the processor system of the host system, a pictorial representation of a report that illustrates that at least one relationship, the pictorial representation having a visual appearance suggestive of a report; the pictorial representation not being the report; and the pictorial representation of the report being different than the diagram;

the providing of the pictorial representation of the report including at least:

providing a box representing the report;

providing within the box multiple graphical lines arranged in at least two columns, each column having a visual correspondence with one of the at least two objects; representing corresponding data associated with the at least two columns with corresponding graphical lines in the at least two columns; and representing data associated with a first column of the at least two columns that does not have corresponding data that is associated with a second column of the at least two columns with graphical lines in the first column that correspond to blanks in the second column.

13. The method of claim 12, the graphical lines being oriented horizontally.

14. The method of claim 12, the graphical lines being oriented horizontally and each column being rectangular.

15. A method for providing an interface for object relationships, comprising:
  (a) receiving, at a database from a user machine that is remote from the host system, a selection of at least a first object and a second object stored in an on-demand database service on a non-transitory machine-readable medium of a memory system of the database and a definition of at least one relationship between the first object and the second object;
  (b) providing, by the processor system of the host system, a pictorial representation of a report that illustrates the at least one relationship, the pictorial representation having a visual appearance suggestive of a report; the pictorial representation not being the report; and the pictorial representation of the report being different than the diagram;
  the providing of the pictorial indication including
  providing by the host system a box representing a report;
    providing by the host system multiple graphical lines arranged in columns, each column having a visual correspondence with a different object than any other column, each graphical line representing data in the object represented by the column;
    representing by the host system the first object with a first column of graphical lines, each graphical line in the first column representing data in the first object; and
    representing by the host system the second object with a second column of graphical lines, each graphical line in the second column representing data in the second object;
  implementing one or more machine instructions that cause the host system to determine whether there is data in the first object that corresponds to data in the second object, and if there is data in the first object that corresponds to data in the second object, causing the host system to represent the data in the first object that corresponds to data in the second object with a first graphical line, which is located in the first column, and a corresponding second graphical line, which is in the second column; and
  implementing one or more machine instructions that cause the host system to determine whether there is also data in the first object that corresponds to data in the second object, and if there is also data in the first object that corresponds to data in the second object, causing the host system to represent the data in the first object that does not correspond to data in the second object with a third graphical line, which is located in the first column, and a corresponding blank space in the second column, the blank space being located where a fourth graphical line would be located were there data in the second object corresponding to the data in the first object represented by the third graphical line.

16. One or more non-transitory computer readable media storing computer program instructions, which when invoked causes a processor system to carry out operations including:
  (a) receiving, at a host system from a user machine that is remote from the host system, a selection of at least a first object and a second object stored in an on-demand database service on a memory system of the host system and a definition of at least one relationship between the first object and the second object;
  (b) providing, to the user machine, based upon the at least one relationship between the first object and the second object, a diagram pictorially illustrating the at least one relationship; and
  (c) providing, to the user machine, a pictorial representation of a report that illustrates the at least one relationship, the pictorial representation having a visual appearance suggestive of a report; the pictorial representation not being the report; and the pictorial representation of the report being different than the diagram;
  (d) providing, to the user machine, in association with the pictorial representation of the report and the diagram, a representation of choices of data relationships, the representation of choices including at least one or more links for accepting user input, and a configurable hierarchical arrangement of selected relationships;
  (e) receiving, at the host system, user input at the server via the one or more links;
  (f) computing a new arrangement that is an update to the configurable hierarchical arrangement, an update to the diagram, and an update to the pictorial representation of the report;
  (g) providing to the user machine the update to the diagram, the update to the pictorial representation of the report and the new arrangement in association with the diagram and the pictorial indication.

* * * * *